(12) United States Patent
De Bruin

(10) Patent No.: US 10,278,500 B2
(45) Date of Patent: May 7, 2019

(54) CABINET LEVELLING APPARATUS

(71) Applicant: Designerscope Limited, Auckland (NZ)

(72) Inventor: Wim Jan De Bruin, Auckland (NZ)

(73) Assignee: Designerscope Limited, Auckland (NZ)

(*) Notice: Subject to any disclaimer, the term of this patent is extended or adjusted under 35 U.S.C. 154(b) by 0 days.

(21) Appl. No.: 15/028,295

(22) PCT Filed: Oct. 8, 2014

(86) PCT No.: PCT/NZ2014/000215
§ 371 (c)(1),
(2) Date: Apr. 8, 2016

(87) PCT Pub. No.: WO2015/053637
PCT Pub. Date: Apr. 16, 2015

(65) Prior Publication Data
US 2016/0235200 A1   Aug. 18, 2016

(30) Foreign Application Priority Data

Oct. 11, 2013  (NZ) ........................................ 616566
Mar. 27, 2014  (NZ) ........................................ 623065
(Continued)

(51) Int. Cl.
*A47B 91/02*   (2006.01)
*D06F 39/12*   (2006.01)
(Continued)

(52) U.S. Cl.
CPC ............ *A47B 91/024* (2013.01); *A47B 91/02* (2013.01); *B25B 13/46* (2013.01);
(Continued)

(58) Field of Classification Search
CPC .... D06F 39/125; F16M 7/00; F16M 2200/08; A47L 15/4253; F25D 2323/0011; F25D 2400/06; A47B 91/028; A47B 91/024
See application file for complete search history.

(56) References Cited

U.S. PATENT DOCUMENTS 809,078 A     1/1906  Seymour
1,073,294 A * 9/1913  Siewert ......................... 254/103
(Continued)

FOREIGN PATENT DOCUMENTS

CN   1701198 A    11/2005
CN   201303926 Y  9/2009
(Continued)

OTHER PUBLICATIONS

International Search Report issued in PCT/NZ2014/000215 dated Mar. 30, 2015.

*Primary Examiner* — Bradley Duckworth
(74) *Attorney, Agent, or Firm* — Arnold & Porter Kaye Scholer LLP; David Marsh

(57) ABSTRACT

An apparatus for adjusting a height adjustable leg for supporting a cabinet, appliance or structure is described. The apparatus includes a coupling (10) comprising a driven member or feature (13). The coupling forms part of a height adjustable leg. The apparatus also includes a tool (50) comprising a driving member (51) and a torque input (52) for applying torque to the driving member. The tool and the coupling are complementarily adapted to releasably maintain engagement between the driving member and the driven member or feature to allow the driving member to drive the driven member or feature to rotate the coupling about a longitudinal axis of the leg for height adjustment of the leg. The driving member and the driven member are gears that releasably mesh together when the tool is engaged with the coupling.

26 Claims, 18 Drawing Sheets

(30) Foreign Application Priority Data

Jun. 6, 2014 (NZ) .......................................... 625994
Dec. 9, 2014 (NZ) .......................................... 631676

(51) Int. Cl.

| | |
|---|---|
| *F16M 7/00* | (2006.01) |
| *B25B 13/46* | (2006.01) |
| *B25B 23/00* | (2006.01) |
| *F16M 11/24* | (2006.01) |
| *A47L 15/42* | (2006.01) |

(52) U.S. Cl.
CPC ........ *B25B 23/0028* (2013.01); *D06F 39/125* (2013.01); *F16M 7/00* (2013.01); *F16M 11/24* (2013.01); *A47L 15/4253* (2013.01); *F16M 2200/08* (2013.01)

(56) References Cited

U.S. PATENT DOCUMENTS

| | | | | |
|---|---|---|---|---|
| 1,632,383 | A * | 6/1927 | Seiden | A47B 91/028 248/188.4 |
| 2,512,068 | A * | 6/1950 | Mayo | 33/10 |
| 2,828,578 | A * | 4/1958 | McCabe | 248/188.4 |
| 4,991,805 | A * | 2/1991 | Solak | F16M 7/00 248/188.4 |
| 5,292,095 | A | 3/1994 | Cattaneo | |
| 5,967,472 | A * | 10/1999 | Wilhelmstatter | A47B 91/028 248/188.2 |
| 6,135,401 | A * | 10/2000 | Chen | 248/188.5 |
| 6,279,860 | B1 * | 8/2001 | Swanger | 248/125.2 |
| 6,910,665 | B2 * | 6/2005 | Avendano et al. | 248/188.2 |
| 7,293,484 | B2 | 11/2007 | Liu | |
| 7,556,227 | B2 * | 7/2009 | Thuelig | 248/188.8 |
| 7,762,158 | B2 * | 7/2010 | Shieh | A47B 9/04 74/519 |
| 8,727,301 | B2 * | 5/2014 | Arslankiray | A47B 91/028 126/304 A |
| 8,960,633 | B2 * | 2/2015 | Hunze | F16M 7/00 248/657 |
| D769,095 | S * | 10/2016 | De Bruin | D8/51 |
| D793,194 | S * | 8/2017 | De Bruin | D8/51 |
| D796,882 | S * | 9/2017 | De Bruin | D6/710 |
| 2003/0136887 | A1 * | 7/2003 | Gabriel | A47L 15/4253 248/188.2 |
| 2006/0162505 | A1 * | 7/2006 | Choi | B25B 13/48 81/119 |
| 2006/0162508 | A1 | 7/2006 | Liu | |
| 2008/0168855 | A1 * | 7/2008 | Giefer | |
| 2011/0297802 | A1 | 12/2011 | Gennaretti et al. | |
| 2012/0280607 | A1 * | 11/2012 | Doberstein | F25D 23/00 312/401 |

FOREIGN PATENT DOCUMENTS

| | | |
|---|---|---|
| CN | 202140751 U | 2/2012 |
| CN | 102654724 | 5/2012 |
| CN | 203023749 U | 6/2013 |
| DE | 25 54 109 A1 | 6/1976 |
| DE | 25 54 138 A1 | 7/1976 |
| DE | 29 03 835 A1 | 4/1980 |
| DE | 10124092 A1 | 1/2003 |
| DE | 10 2004 050362 A1 | 4/2006 |
| EP | 0 292 921 A2 | 11/1988 |
| EP | 0 321 005 B1 | 2/1992 |
| JP | 09206147 A | 8/1997 |
| JP | 2733833 | 3/1998 |
| JP | 2008-213058 | 9/2008 |
| JP | 4865441 | 2/2012 |
| RU | 2438548 C2 | 1/2012 |

* cited by examiner

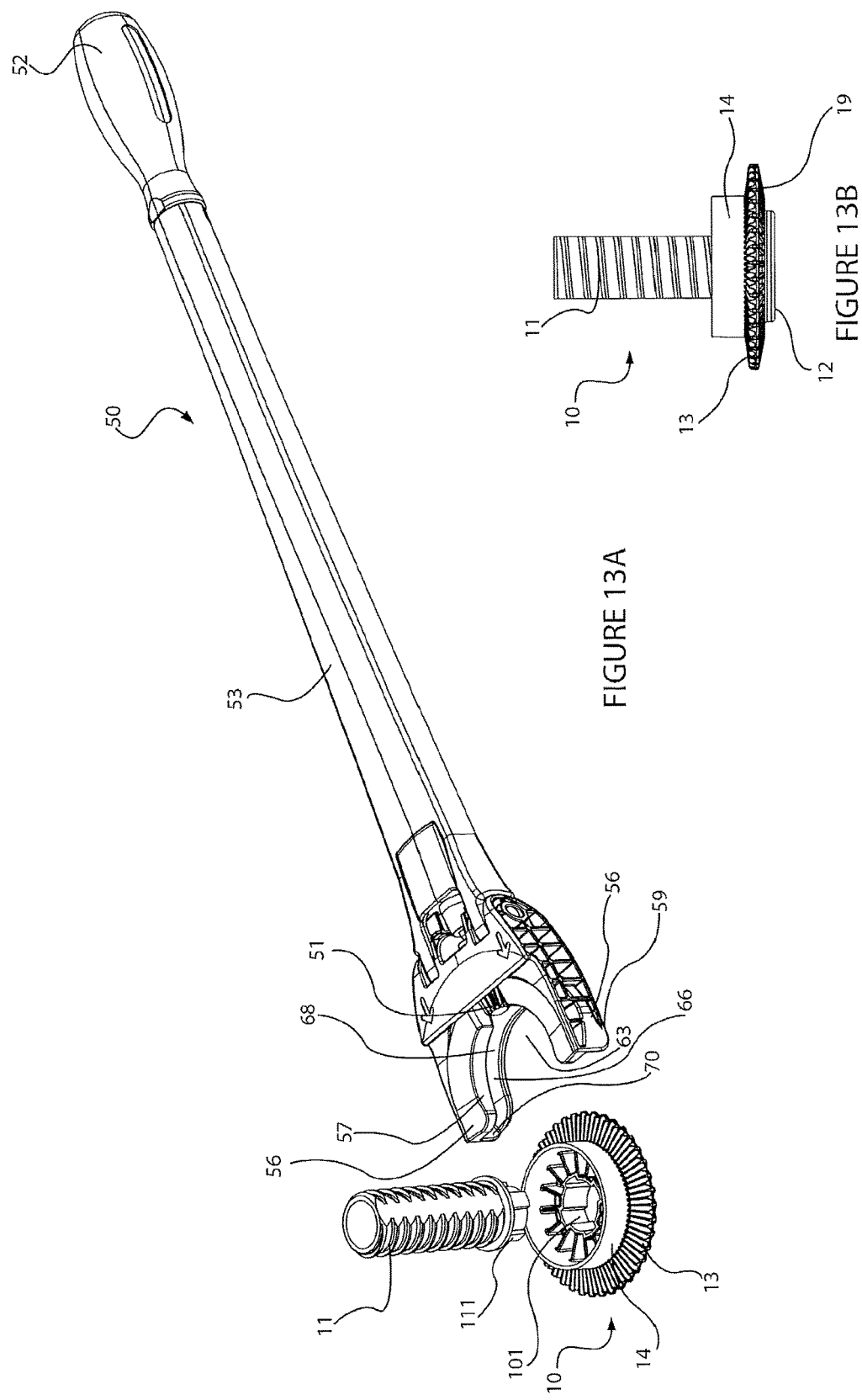

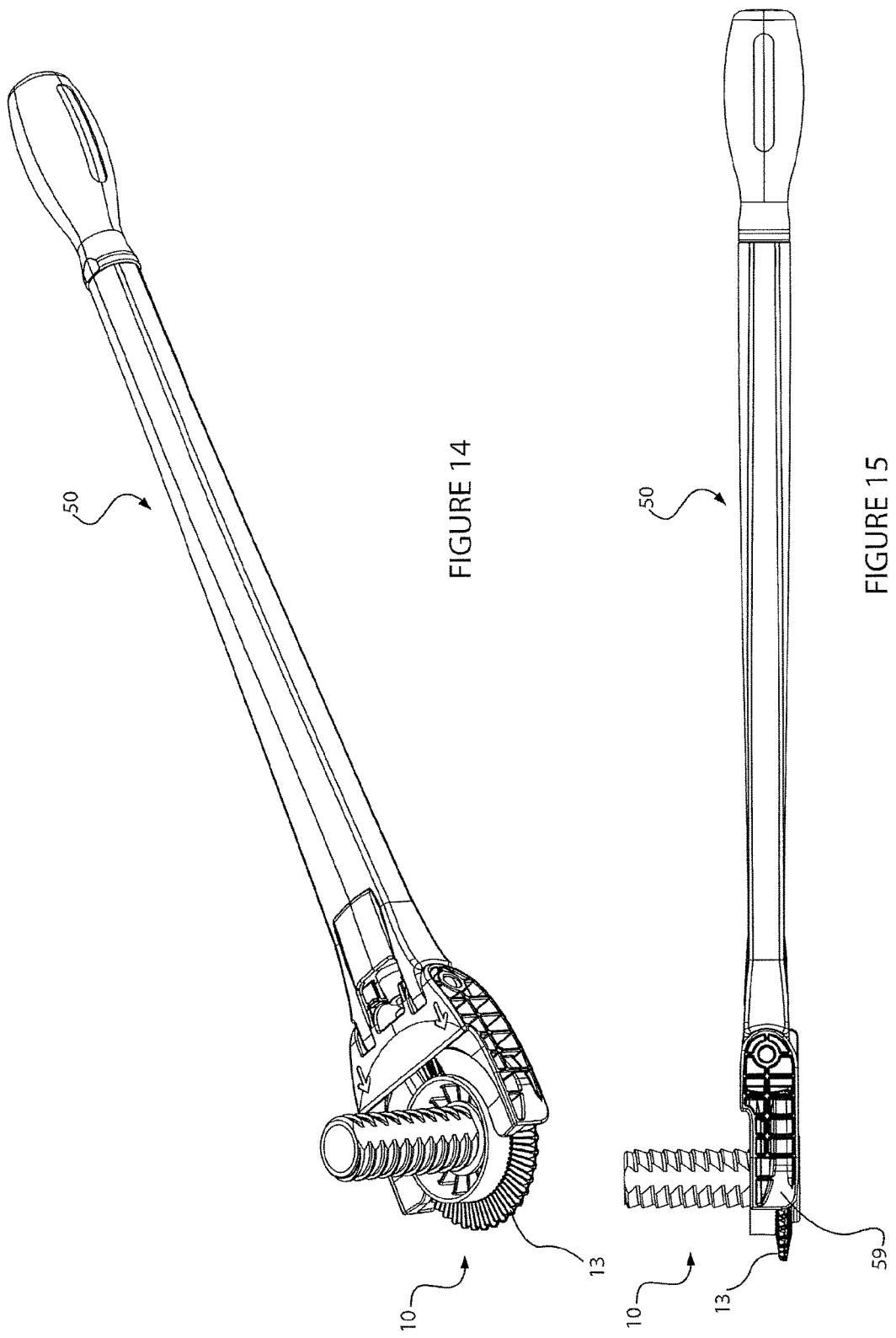

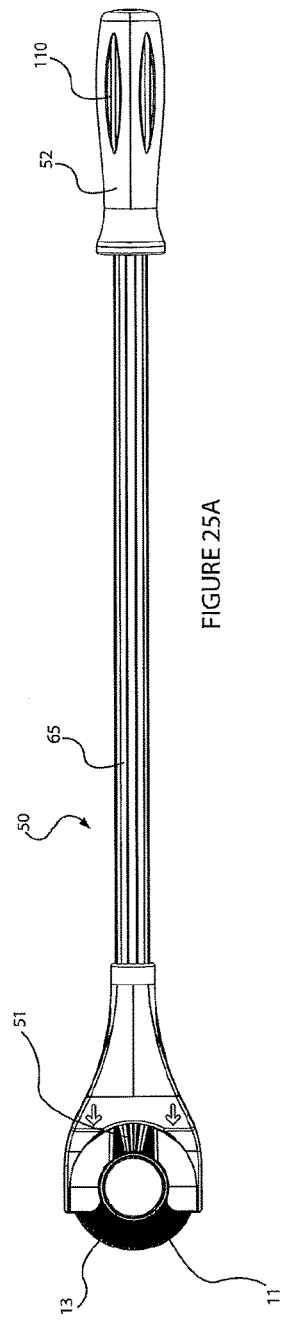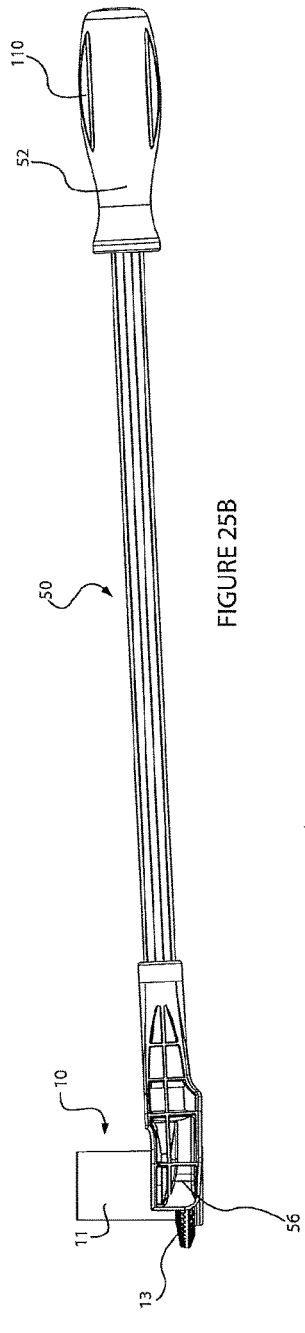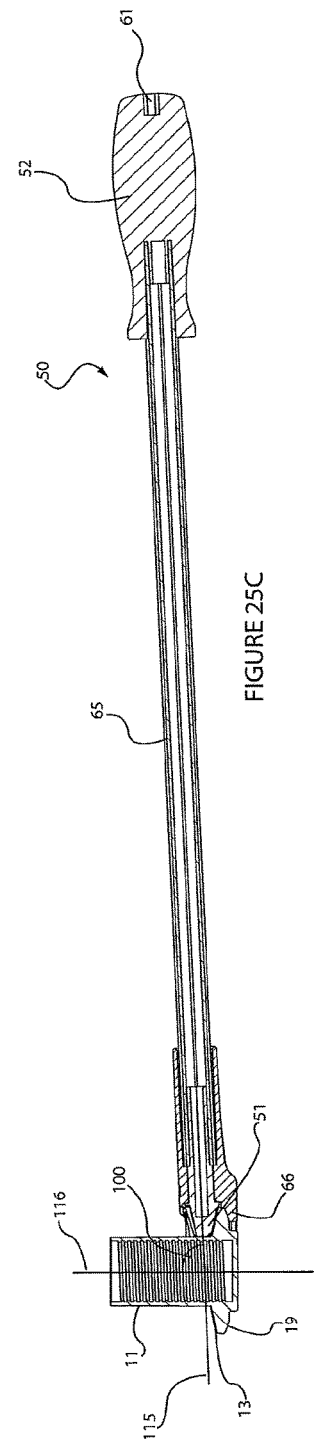

CABINET LEVELLING APPARATUS

CROSS REFERENCE TO RELATED APPLICATION

This application is a National Stage Application of International Application Number PCT/NZ2014/000215, filed Oct. 8, 2014, which is hereby incorporated by reference.

FIELD OF THE INVENTION

The present invention relates to an apparatus for adjusting a height adjustable leg for leveling or adjusting the height of cabinetry such as kitchen, bathroom or laundry cabinetry, or an appliance, or any other object that requires height or leveling adjustment. The present invention also relates to a coupling for forming part of a height adjustable leg, and a tool for adjusting the height of a height adjustable leg via such a coupling.

BACKGROUND TO THE INVENTION

Height adjustable legs that are used to support cabinets, appliances, furniture or the like are known. They typically comprise a vertically extending threaded shaft received in a corresponding threaded socket fixed to an appliance or cabinet to be height adjusted or leveled. The socket is fixed to the object, so that rotation of the shaft causes a foot of the leg to move axially relative to the socket to set the height of the object supported by the foot. To rotate or turn the threaded shaft in the corresponding threaded socket, the foot may comprise an engagement feature such as a hexagonal or square profile to which a laterally extending tool such as a spanner may engage. Alternatively the foot may be rotated by hand by a user.

A tool used for adjusting the height of the leg may engage the foot from a lateral direction. A tool such as a spanner when engaged with the foot extends laterally from the foot to provide a moment arm for turning the foot. A user adjusts the height of the leg by moving the handle of the tool through an arc about or around the foot. Movement of the handle of the tool around the foot can be impeded by adjacent feet, equipment, walls, or cabinetry positioned beside the object being height adjusted, or the object itself, such that the foot may be adjusted only through a series of repeated short arc lengths. Height adjustment of a leg may hence require a user to disengage and re-engage the tool and foot many times to turn the foot through a sufficient amount of angular movement within a limited arc length or angle of rotation. This can be time consuming and alignment may not be easy to achieve each time the tool is to be re-engaged. Alignment vertically, tangentially and radially is necessary in order to re engage.

Adjustment of a foot located at the rear of a cabinet or appliance may be difficult, as an extra long tool handle may be required to reach the back feet from the front of the cabinet, such that the adjustment arc for the tool handle to operate in is further limited. Additionally, alignment between the jaw of the tool and the corresponding engagement feature on a rear foot can be difficult due to the difficulty in viewing and/or reaching the rear feet of a cabinet. A user may be required to lie down on a floor surface to view the rear feet in order to properly engage an adjustment tool to the foot for height adjustment.

Tools such as standard spanners or screw drivers typically used to adjust height adjustable legs are not designed specifically for the purpose of adjusting a height adjustable leg. The use of non-specific tools or adjusting a leg by hand can present health and safety issues for the user.

In an alternative height adjustable leg, the threaded shaft of the leg may be received in a threaded collar or sprocket that is fixed in height relative to the object to be levelled, but free to rotate. Rotation of the threaded shaft of the foot is prevented, for example by a flat section or sections on the threaded shaft received in a corresponding socket fixed to the object to be height adjusted. Rotation of the collar causes the shaft to move axially relative to the collar to set the height of the object supported by the foot. The collar may comprise an engagement feature such as a hexagonal or square profile to which a laterally extending tool such as a spanner may engage. Adjustment of a foot threaded shaft and collar arrangement may have similar problems for height adjustment as described above; limited adjustment arc length and difficulty in aligning the tool and the collar for adjustment.

An adjustable foot for an appliance is described in U.S. Pat. No. 7,556,227 (Miele). The appliance is fitted with a rod and pinion. The pinion engages with a sprocket so that rotation of the rod rotates the sprocket to adjust the height of the foot. The rod is supported by the appliance to be held in engagement with the sprocket and extends to the front of the appliance. Adjustment of the rear feet of the appliance can be made using a standard screw driver from the front of the appliance. The appliance is fitted with a pinion and rod for each rear foot so that each rear foot can be adjusted from the front of the appliance. This mechanism may be complex to install within the appliance. Each foot has an associated pinion and driving mechanism which effectively become redundant once the height is set. The front feet are adjusted by a standard screw driver inserted in a vertical slot of the foot. The screw driver is moved through an arc length and may be engaged and disengaged with a front foot a number of times to complete height adjustment of the front of the appliance.

A tool for adjusting a foot or leg of an appliance is described in JP1997-206147 (Takigen). The tool includes a ratchet mechanism comprising a ratchet lever or pawl for engaging a ratchet gear on the shaft. With the lever engaged with the gear, the tool is used to adjust the foot by moving the handle of the tool through an arc about or around the foot to rotate the foot, in much the same way in which a standard spanner is used to adjust a foot. The ratchet lever engages the gear in one direction of rotation, and disengages from the gear in the opposite direction of rotation, to allow the tool handle to be moved back and forth in a defined arc length around the foot to adjust the height of the leg in one direction. To change the direction of adjustment (for example from upwards to downwards) it is necessary to switch the lever arm of the ratchet mechanism between two positions.

JP2008-213058 (Takigen) describes a similar foot to JP1997-206147 but includes a horizontally pivoting tool head to allow the tool to engage with a foot around obstacles. The pivoting head reduces the arc length in which the handle must be moved to crank the foot for height adjustment. Like the tool of JP1997-206147, to change the direction of adjustment (for example from upwards to downwards) it is necessary to switch the lever arm of the ratchet mechanism between two positions.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved apparatus for adjusting a height adjustable leg, or an improved tool for adjusting a height adjustable leg, or an improved coupling adapted to be attached to or engaged with a height adjustable leg for interfacing with a tool for adjusting the leg, or to at least provide the industry with a useful choice.

SUMMARY OF THE INVENTION

In one aspect, the present invention consists in an apparatus for adjusting a height adjustable leg for supporting a cabinet, appliance or structure comprising:

a coupling for forming part of a height adjustable leg, the coupling comprising a driven member or feature, and a tool comprising a driving member and a torque input for applying torque to the driving member, the tool and the coupling complementarily adapted to releasably maintain engagement between the driving member and the driven member or feature to allow the driving member to drive the driven member or feature to rotate the coupling about a longitudinal axis of the leg for height adjustment of the leg, and wherein the driving member and the driven member are gears that releasably mesh together when the tool is engaged with the coupling.

In some embodiments the tool and coupling are complementarily adapted so that the tool can engage the coupling laterally from any angular direction relative to the longitudinal axis of the leg.

In some embodiments the torque input or the torque input and the driving member each rotates about a lateral axis relative to a longitudinal axis of the leg when driving the driven member or feature.

In some embodiments the lateral axis is substantially perpendicular to the longitudinal axis of the leg.

In some embodiments the torque input rotates on a lateral axis that is at an angle to the longitudinal axis of the leg, so that with the tool engaged with the coupling the torque input is elevated above a floor surface or other surface on which the leg is to be positioned when supporting the cabinet, appliance or structure.

In some embodiments the lateral axis is at an angle of 77.5 to 90 degrees, or 85 to 90 degrees, or 86 to 88 degrees, or 87 to 88 degrees or about 87.5 degrees to the longitudinal axis of the leg.

In some embodiments the driving member has a rotational axis able to articulate from a rotational axis of the torque input.

In some embodiments the driving member and the torque input are fixed together to both rotate on the lateral axis.

In some embodiments the driving member is a pinion. In some embodiments the driven member or feature comprises a rotary rack.

In some embodiments the torque input comprises a handle coupled to the driving member, with the driving member engaged to the driven member or feature, rotation of the handle about an axis of the handle independent of a longitudinal axis of the leg rotating the driven member or feature for height adjustment of the leg.

In some embodiments the handle has engagement features for engaging with a handle extension.

In some embodiments the engagement features are a plurality of longitudinal slots or ribs on the outside surface of the handle.

In some embodiments the tool is adapted to remain in a stationary angular position relative to the leg when the driving member drives the driven member or feature.

In some embodiments the tool and coupling are adapted to remain continuously engaged when the driving member drives the driven member or feature to rotate about the longitudinal axis of the leg in both directions so that the direction of height adjustment of the height adjustable leg can be reversed without removing the tool from the coupling.

In some embodiments, with the tool engaged with the coupling the driving member and the driven member are adapted to remain engaged for continuously adjusting the height of the height adjustable leg in at least one direction.

In some embodiments with the tool engaged with the coupling the driving member and the driven member are adapted to remain continuously engaged for adjusting the height of the height adjustable leg in both directions.

In some embodiments the tool and the coupling are complementarily adapted so that the tool is secured relative to the coupling in an axial direction and a lateral direction when engaged with the coupling.

In some embodiments the tool and the coupling are complementarily adapted so that the tool is secured to the coupling in both axial directions when engaged with the coupling.

In some embodiments the coupling is a foot comprising the driven member or feature and a threaded socket or a threaded shaft for engaging a corresponding threaded shaft or socket to form the height adjustable leg.

In some embodiments the driven member is integrally formed with the threaded socket or the threaded shaft.

In some embodiments the driven member is attached to the threaded socket or the threaded shaft.

In some embodiments the driven member is releasably attached to the threaded socket or the threaded shaft.

In some embodiments the coupling is adapted to be attached to a threaded socket or a threaded shaft for engaging a corresponding threaded shaft or socket to form the height adjustable leg.

In some embodiments the coupling is adapted to be releasably attached to the threaded socket or the threaded shaft.

In some embodiments the driven member or feature remains at a fixed height relative to a floor surface or other surface on which the leg is to be positioned when vertically supporting the cabinet, appliance or structure.

In some embodiments the tool comprises a guide or positioning feature or features for setting the driving member at a height relative to the floor surface or other surface so that the driving member is positioned axially relative to the coupling for engagement with the driven member, the height of the driven member and height of the driving member both being referenced from the floor surface or other surface.

In some embodiments the coupling is adapted to threadably engage a threaded shaft of the leg rotationally fixed to the cabinet, appliance or structure, and the coupling supporting the cabinet, appliance or structure on the shaft, rotation of the coupling on the shaft moving the cabinet, appliance or structure along the shaft for height adjustment.

In some embodiments the tool comprises a lateral extension for capturing or bearing against a lateral facing surface of the coupling to releasably retain the tool to the coupling in a lateral direction.

In some embodiments the tool comprises two lateral extensions forming a jaw for capturing a diameter of the coupling to releasably retain the tool to the coupling in a lateral direction to releasably maintain engagement between the driving member and the driven member or feature when the driving member drives the driven member for height adjustment of the leg.

In some embodiments the jaw extends around a diameter of the coupling by more than 180 degrees.

In some embodiments the tool comprises an axial facing bearing surface and the coupling comprises a corresponding axial facing bearing surface, contact between the tool and coupling axial facing bearing surfaces releasably retaining the tool to the coupling in an axial direction to releasably maintain engagement between the driving member and the driven member or feature.

In some embodiments the tool comprises a ramp surface to bear against the axial facing surface of the coupling when aligning the tool to the coupling in use to position the tool to the coupling axially.

In some embodiments the tool comprises a flange for bearing against a backside of the driven member, the flange providing the axial facing bearing surface of the tool and the backside of the driven member being the axial facing bearing surface of the coupling.

In some embodiments the flange contacts the back side of the driven member with the tool engaged with the coupling at least at an angular position at which the driving member engages the driven member.

In some embodiments the flange contacts the back side of the driven member with the tool engaged with the coupling at a perimeter portion of the back side of the driven member.

In some embodiments the flange captures a diameter of the coupling to releasably retain the tool to the coupling in a lateral direction to releasably maintain engagement between the driving member and the driven member or feature.

In some embodiments the flange contacts around the back side of the driven member over an angular distance of 180 degrees or more.

In some embodiments with the tool engaged with the coupling the driven member is captured between the driving member and the axial facing bearing surface of the tool.

In some embodiments the tool comprises a first axial facing bearing surface and a second opposite axial facing bearing surface and the coupling comprises two corresponding axial facing bearing surfaces to align the tool to the coupling.

In some embodiments the axial facing bearing surfaces of the coupling form sides of a slot or channel extending circumferentially around the coupling and the tool comprises a lateral extension that engages the slot or channel, axial sides of the lateral extension providing the axial facing bearing surfaces of the tool.

In some embodiments the driven member or feature is a rotary rack forming one side of the slot or channel, teeth of the driven member or feature providing a discontinuous said axial facing bearing surface, and with the tool engaged with the coupling the driving member being received in the slot or channel to engage the driving member or feature.

In some embodiments the first and second axial facing bearing surfaces of the tool form sides of a slot or channel and the coupling comprises a flange that engages the slot or channel, axial sides of the flange providing the axial facing bearing surfaces of the coupling to align the tool to the coupling.

In some embodiments the first and second axial facing bearing surfaces each comprise a ramp surface at an opening of the slot to provide converging surfaces extending into the slot to assist with aligning the tool to the coupling.

In some embodiments the first and second axial facing bearing surfaces of the tool form sides of a slot or channel in the tool and the driven member is a rotary rack, the rotary rack adapted to engage the slot or channel in the tool, teeth of the rotary rack providing a discontinuous said axial facing bearing surface and a back side of the rotary rack providing the other said axial facing bearing surface.

In some embodiments the driven member or feature is a rotary rack facing upwards and the driving member is a pinion, and the thread of the shaft or the socket is a right hand thread so that rotation of the pinion in a clockwise direction about a lateral axis rotates the threaded shaft to increase the height of the cabinet, appliance or structure.

In some embodiments the torque input comprises an interface for connecting an additional tool for applying torque to the driving member.

In some embodiments the apparatus comprises a spacer adapted to be removably attached to a base of the coupling to set a height of the driven member relative to a floor surface or other surface.

In another aspect, the present invention consists in a coupling for forming part of a height adjustable leg for supporting a cabinet, appliance or structure, the coupling comprising:

a driven member or feature, and the coupling adapted to releasably maintain engagement with a tool comprising a driving member to allow the driving member to drive the driven member or feature to rotate the coupling about a longitudinal axis of the leg for height adjustment of the leg, and wherein the driven member or feature is a gear adapted to releasably mesh with the driving member of the tool.

In some embodiments the coupling is adapted to receive the tool laterally from any angular direction relative to the longitudinal axis of the leg.

In some embodiments the driven member or feature comprises a rotary rack.

In some embodiments the coupling is adapted to be driven by the tool with the tool held in a stationary angular position relative to the leg when the driving member drives the driven member or feature.

In some embodiments the coupling is adapted to be driven by the tool with the tool continuously engaged with the coupling when the driving member drives the driven member or feature to rotate about the longitudinal axis of the leg in both directions so that the direction of height adjustment of the height adjustable leg can be reversed without removing the tool from the coupling.

In some embodiments the coupling is adapted to secure the tool relative to the coupling in an axial direction and a lateral direction.

In some embodiments the coupling is adapted to secure the tool to the coupling in both axial directions.

In some embodiments the coupling is a foot comprising the driven member or feature and a threaded socket or a threaded shaft for engaging a corresponding threaded shaft or socket to form the height adjustable leg.

In some embodiments the driven member is integrally formed with the threaded socket or the threaded shaft.

In some embodiments the driven member is attached to the threaded socket or the threaded shaft.

In some embodiments the driven member is releasably attached to the threaded socket or the threaded shaft.

In some embodiments the coupling is adapted to be attached to a threaded socket or a threaded shaft for engaging a corresponding threaded shaft or socket to form the height adjustable leg.

In some embodiments the coupling is adapted to be releasably attached to the threaded socket or the threaded shaft.

In some embodiments the driven member or feature remains at a fixed height relative to a floor surface or other surface on which the leg is to be positioned when supporting the weight of the cabinet, appliance or structure.

In some embodiments the coupling is adapted to threadably engage a threaded shaft of the leg rotationally fixed to the cabinet, appliance or structure, and the coupling supporting the cabinet, appliance or structure on the shaft, rotation of the coupling on the shaft moving the cabinet, appliance or structure along the shaft for height adjustment.

In some embodiments the coupling comprises an axial facing bearing surface to interface with a corresponding axial facing bearing surface on the tool so that contact between the tool and coupling axial facing bearing surfaces releasably retains the tool to the coupling in an axial direction to releasably maintain engagement between the driving member and the driven member or feature.

In some embodiments the driven member is a rotary rack and a back side of the rotary rack comprises the axial facing bearing surface of the coupling.

In some embodiments the axial facing bearing surface is at an angle of 0 to 12.5 degrees, where 0 degrees is perpendicular to the longitudinal axis of the coupling.

In some embodiments the axial facing bearing surface is substantially perpendicular to the longitudinal axis of the coupling.

In some embodiments the axial facing bearing surface is at a perimeter portion of the back side of the rack.

In some embodiments an inner portion of the back side of the rack is inclined.

In some embodiments the driven member is a rotary rack and a back side of the rotary rack comprises an inclined surface so that the thickness of the rotary rack at the perimeter of the rotary rack is less than the thickness of the rotary rack at an inner diameter of the rotary rack.

In some embodiments the coupling comprises a first axial facing bearing surface and a second opposite axial facing bearing surface to interface with two corresponding axial facing bearing surfaces of the tool so that contact between the tool and coupling axial facing bearing surfaces releasably retains the tool to the coupling in an axial direction to releasably maintain engagement between the driving member and the driven member or feature.

In some embodiments the axial facing bearing surfaces of the coupling form sides of a slot or channel extending circumferentially around the coupling for receiving a lateral extension of the tool.

In some embodiments the driven member or feature is a rotary rack forming one side of the slot or channel, teeth of the driven member or feature providing a discontinuous said axial facing bearing surface.

In some embodiments the coupling comprises a lateral flange for engaging a slot or channel in the tool, axial sides of the flange providing the axial facing bearing surfaces of the coupling.

In some embodiments the driving member is a rotary rack, the rotary rack adapted to engage a slot or channel in the tool, teeth of the rotary rack providing a discontinuous said axial facing bearing surface and a back side of the driven member providing the other said second axial facing bearing surface.

In some embodiments the rotary rack comprises 40 to 200 teeth.

In some embodiments each tooth comprises a flat portion at a tip of the tooth, the flat portions of the teeth combining to form the discontinuous axial facing bearing surface.

In some embodiments the driven member or feature is a rotary rack facing upwards and the thread of the shaft or the socket is a right hand thread.

In some embodiments the coupling includes a spacer adapted to be removably attached to a base of the coupling to set a height of the driven member relative to a floor surface or other surface.

In another aspect, the present invention consists in a coupling for forming part of a height adjustable leg for supporting a cabinet, appliance or structure, the coupling comprising:
  a rotationally drivable member to rotate about an axis and
    presenting radial gear teeth that face in one direction of
    said axis and presenting a bearing surface that faces in
    the opposite direction of said axis.

In some embodiments the drivable member is engageable by a tool that includes a gear to engage with said radial gear teeth of said drivable member and a bearing member to locate against said bearing surface to hold said gear and gear teeth in engagement in the axial direction.

In some embodiments the bearing surface is at an angle of 0 to 12.5 degrees, where 0 degrees is perpendicular to the axis.

In some embodiments the coupling includes a shaft or socket coaxial said axis and coupled or formed with the drivable member.

In some embodiments the shaft or socket is a threaded shaft or socket.

In some embodiments the diameter of the shaft or socket is greater than 15 mm.

In another aspect, the present invention consists in a height adjustable leg for supporting an cabinet, appliance or structure comprising a coupling as described by any one or more of the above statements relating to a said coupling.

In another aspect, the present invention consists in a cabinet, appliance or structure comprising a leg or more than one leg, the leg comprising a coupling as described by any one or more of the above statements relating to a said coupling.

In another aspect, the present invention consists in a tool for driving a height adjustable leg supporting a cabinet, appliance or structure comprising:
  a driving member and a torque input for applying torque
    to the driving member, the tool adapted to releasably
    maintain engagement with a coupling of the height
    adjustable leg comprising a driven member or feature
    to allow the driving member to drive the driven mem-
    ber or feature to adjust the height of the cabinet,
    appliance or structure, and
  wherein the driving member is a gear adapted to releas-
    ably mesh with the driven member of the coupling.

In some embodiments the tool is adapted to engage the coupling laterally from any angular direction relative to the longitudinal axis of the leg.

In some embodiments the torque input or the torque input and the driving member each rotates about a lateral axis relative to a rotational axis of the leg when driving the driven member or feature.

In some embodiments the lateral axis is substantially perpendicular to the longitudinal axis of the leg.

In some embodiments the torque input rotates on a lateral axis that is at an angle to the longitudinal axis of the leg, so that with the tool engaged with the coupling the torque input is elevated above a floor surface or other surface on which the leg is to be positioned when supporting the cabinet, appliance or structure.

In some embodiments the lateral axis is at an angle of 77.5 to 90 degrees, or 85 to 90 degrees, or 86 to 88 degrees, or 87 to 88 degrees or about 87.5 degrees to the longitudinal axis of the leg.

In some embodiments the driving member has a rotational axis able to articulate from a rotational axis of the torque input.

In some embodiments the driving member and the torque input are fixed together to rotate only on the lateral axis.

In some embodiments the driving member is a pinion.

In some embodiments the torque input comprises a handle coupled to the driving member for rotating the driving member, in use the handle comprising a rotational axis independent of a rotational axis of the coupling.

In some embodiments the handle has engagement features for engaging with a handle extension.

In some embodiments the engagement features are a plurality of longitudinal slots or ribs on the outside surface of the handle.

In some embodiments the tool is adapted to remain in a stationary angular position relative to the leg when the driving member drives the driven member or feature.

In some embodiments the tool is adapted to remain continuously engaged with the coupling when the driving member drives the driven member or feature to rotate about the longitudinal axis of the leg in both directions so that the direction of height adjustment of the height adjustable leg can be reversed without removing the tool from the coupling.

In some embodiments with the tool engaged with the coupling the driving member is adapted to remain continuously engaged with the driven member for adjusting the height of the height adjustable leg in both directions.

In some embodiments the tool is adapted to be secured relative to the coupling in an axial direction and a lateral direction when engaged with the coupling.

In some embodiments the tool is adapted to be secured to the coupling in both axial directions.

In some embodiments the tool comprises a guide or positioning feature or features for setting the driving member at a height relative to a floor surface or other surface supporting the leg.

In some embodiments the tool comprises a lateral extension for capturing or bearing against a lateral facing surface of the coupling to releasably retain the tool to the coupling in a lateral direction.

In some embodiments the tool comprises two lateral extensions forming a jaw for capturing a diameter of the coupling to releasably retain the tool to the coupling in a lateral direction to releasably maintain engagement between the driving member and the driven member or feature.

In some embodiments the jaw extends around a diameter of the coupling by more than 180 degrees.

In some embodiments the tool comprises an axial facing bearing surface to interface with a corresponding axial facing bearing surface on the coupling so that contact between the tool and coupling axial facing bearing surfaces releasably retains the tool to the coupling in an axial direction to releasably maintain engagement between the driving member and the driven member or feature.

In some embodiments the tool comprises a flange for bearing against a backside of the driven member, the flange providing the axial facing bearing surface of the tool and the backside of the driven member being the axial facing bearing surface of the coupling.

In some embodiments the flange contacts the back side of the driven member with the tool engaged with the coupling at least at an angular position at which the driving member engages the driven member.

In some embodiments the flange contacts the back side of the driven member with the tool engaged with the coupling at a perimeter portion of the back side of the driven member.

In some embodiments the flange captures a diameter of the coupling to releasably retain the tool to the coupling in a lateral direction to releasably maintain engagement between the driving member and the driven member or feature.

In some embodiments the flange contacts around the back side of the driven member over an angular distance of 180 degrees or more.

In some embodiments the axial facing bearing surface is at an angle of 0 to 12.5 degrees, where 0 degrees is perpendicular to the coupling when engaged with the tool.

In some embodiments the axial facing bearing surface is substantially perpendicular to a longitudinal axis of the coupling when engaged with the coupling.

In some embodiments the axial facing bearing surface is adapted to contact the coupling at a perimeter portion of the back side of the driven member.

In some embodiments the driving member is a pinion and an axial gap between the flange and the pinion converges from a forward end of the pinion towards a rearward end of the driving member.

In some embodiments the flange comprises a ramped surface for receiving the driven member between the pinion and the flange to align the driven member to the driving member.

In some embodiments the tool comprises a first axial facing bearing surface and a second opposite axial facing bearing surface to interface with two corresponding axial facing bearing surfaces of the coupling to align the tool to the coupling.

In some embodiments the tool comprises a lateral extension adapted to engage a slot or channel in the coupling and axial sides of the lateral extension providing the axial facing bearing surfaces of the tool.

In some embodiments the first and second axial facing bearing surfaces of the tool form sides of a slot or channel in the tool for receiving a flange of the coupling or the driven member of the coupling, sides of the slot or channel adapted to bear against axial sides of the flange or the driven member to align the tool to the coupling.

In some embodiments the first and second axial facing bearing surfaces each comprise a ramp surface at an opening of the slot to provide converging surfaces extending into the slot to assist with aligning the tool to the coupling.

In some embodiments the torque input comprises an interface for connecting an additional tool for applying torque to the driving member.

In another aspect, the present invention consists in an adjustable prop for supporting a cabinet, appliance or structure carrying a threaded component, and a tool for adjusting the prop relative to the cabinet, appliance or structure, the prop comprising:
a threaded shaft to threadably engage to the threaded component, relative rotation between the shaft and the threaded component moving the shaft axially relative to the threaded component, and
a driven member or feature on the threaded shaft or the threaded component,
the tool comprising a driving member and a torque input for applying torque to the driving member,
the tool and the prop complementarily adapted to releasably maintain engagement between the driving member and the driven member or feature to allow the driving member to drive the driven member or feature to rotate the shaft or the threaded component to move the shaft axially relative to the threaded component, and
wherein the driving member and the driven member are gears that releasably mesh together when the tool is engaged with the prop.

In another aspect, the present invention consists in an adjustable prop for supporting a cabinet, appliance or structure carrying a threaded component comprising:
a threaded shaft to threadably engage to the threaded component, relative rotation between the shaft and the threaded component moving the shaft axially relative to the threaded component,
a driven member or feature on the threaded shaft or the threaded component, and
the prop adapted to releasably maintain engagement with a tool comprising a driving member to allow the driving member to drive the driven member or feature to rotate the shaft or the threaded component to move the shaft axially relative to the threaded component, and
wherein the driven member or feature is a gear adapted to releasably mesh with the driving member of the tool.

In another aspect, the present invention consists in a tool for driving an adjustable prop for supporting a cabinet, appliance or structure carrying a threaded component comprising:
a driving member and a torque input for applying torque to the driving member, the tool adapted to releasably maintain engagement with the adjustable prop comprising a driven member or feature to allow the driving member to drive the driven member or feature to adjust the position of the prop relative to the threaded component, and
wherein the driving member is a gear adapted to releasably mesh with the driven member or feature of the prop.

In another aspect, the present invention consists in a cabinet, appliance or structure to be supported by a floor, said cabinet, appliance or structure comprising:
a base carrying a plurality of threaded components with each a plurality of height adjustable feet are associated, each one of said feet comprising:
a threaded shaft threadably engaged to a corresponding threaded component, relative rotation between the shaft and the threaded component moving the shaft axially relative to the threaded component for height adjustment,
a driven member or feature on the threaded shaft or the threaded component,
where each of the feet is adapted to releasably maintain engagement with a tool comprising a driving member to allow the driving member to drive the driven member or feature to rotate the shaft or the threaded component to move the shaft axially relative to the threaded component, and wherein the driven member or feature is a gear adapted to releasably mesh with the driving member of the tool.

In another aspect, the present invention consists in a tool for driving each of said height adjustable feet of the cabinet, appliance or structure of the previous statement, the tool able to reach each of said feet and become associated therewith, the tool comprising a driving member and a torque input for applying torque to the driving member, the tool adapted to releasably maintain engagement with said height adjustable foot to allow the driving member to drive the driven member or feature to adjust the height of the cabinet, appliance or structure, wherein the driving member is a gear adapted to releasably mesh with the driven member of a said foot.

In some embodiments the tool is adapted to displace relative the floor to reach each of said feet to engage with said driven member and drive said driven member without needing to rotate about a longitudinal axis of the foot.

In some embodiments the tool is adapted to slide along the floor to reach and be aligned with each of said feet to engage with said driven member and drive said driven member without needing to slide relative the floor or rotate about a longitudinal axis of the foot.

The term "comprising" as used in this specification and claims means "consisting at least in part of". When interpreting each statement in this specification that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

As used herein the term "floor" or the phrase "floor surface" should be interpreted to mean any surface which supports the foot being described or claimed.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the following drawings.

FIG. 13A is a perspective view of a foot and a tool according to another embodiment of the present invention.

FIG. 13B is a side view of the foot illustrated in FIG. 13A.

FIG. 14 is a perspective view of the foot and the tool of FIG. 13A with the tool engaged with the foot.

FIG. 15 is a side view of the foot and the tool of FIG. 13A with the tool engaged with the foot.

FIG. 25A is a part sectional plan view of a tool according to another embodiment of the present invention shown engaged with a height adjustable leg.

FIG. 25B is a part side view of the tool of FIG. 25A shown engaged with a height adjustable leg.

FIG. 25C is a part sectional side view of the tool of FIG. 25A shown engaged with a height adjustable leg.

DETAILED DESCRIPTION OF PREFERRED EMBODIMENTS

Figure 1:
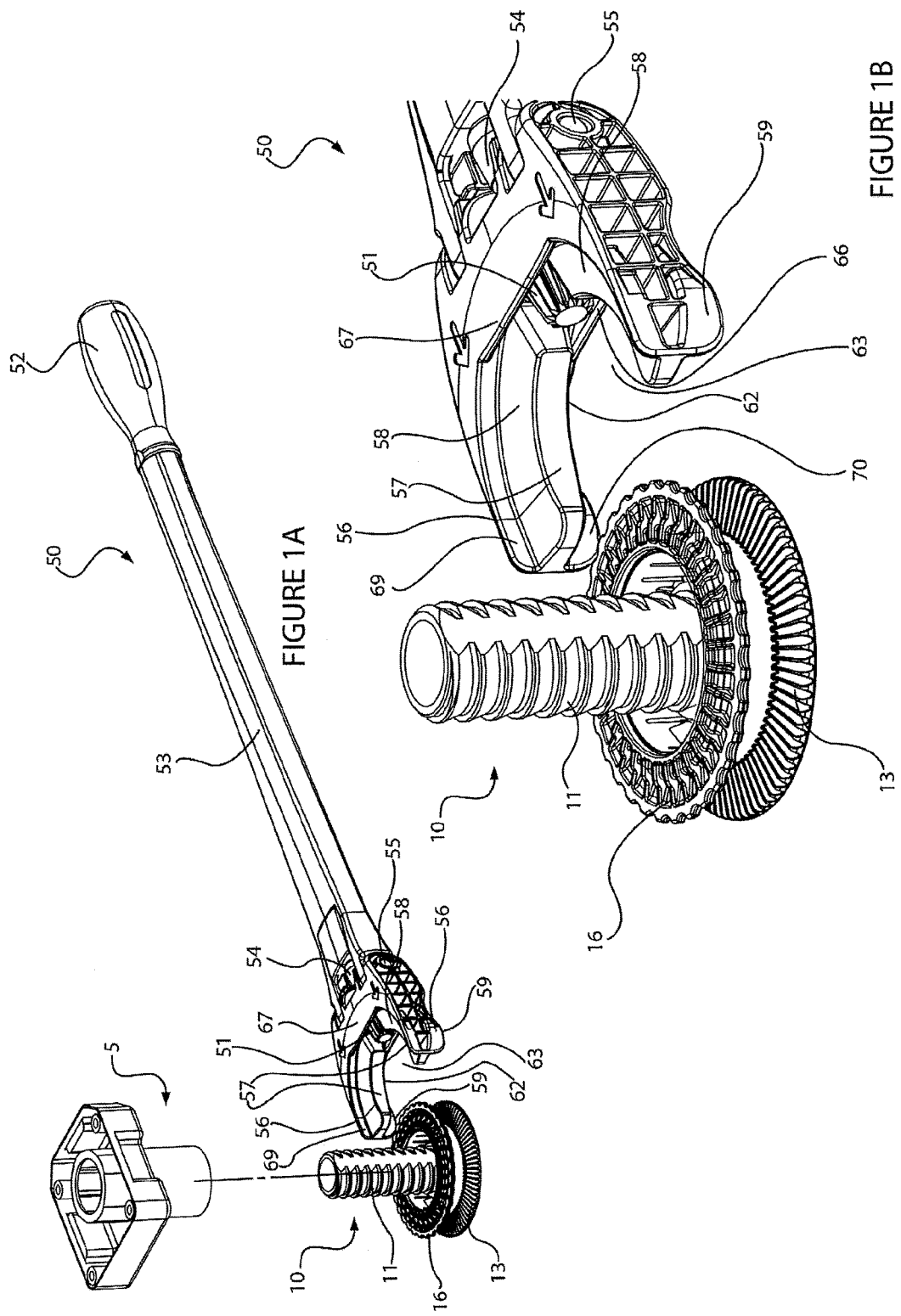
FIG. 1A is a perspective view of a foot and a tool for adjusting the foot to adjust the height of an object supported by the foot. In use the foot is received in a threaded socket attached to the object.
FIG. 1B is a close up view of part of the tool and the foot of FIG. 1A.
Figure 2:
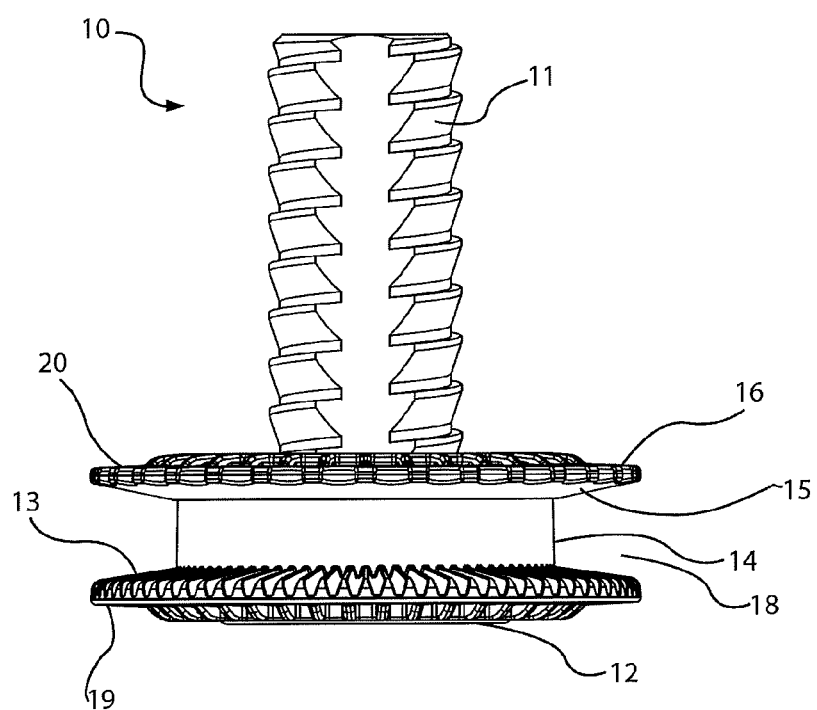
FIG. 2 is a side view of the foot illustrated in FIG. 1A.
Figure 3:
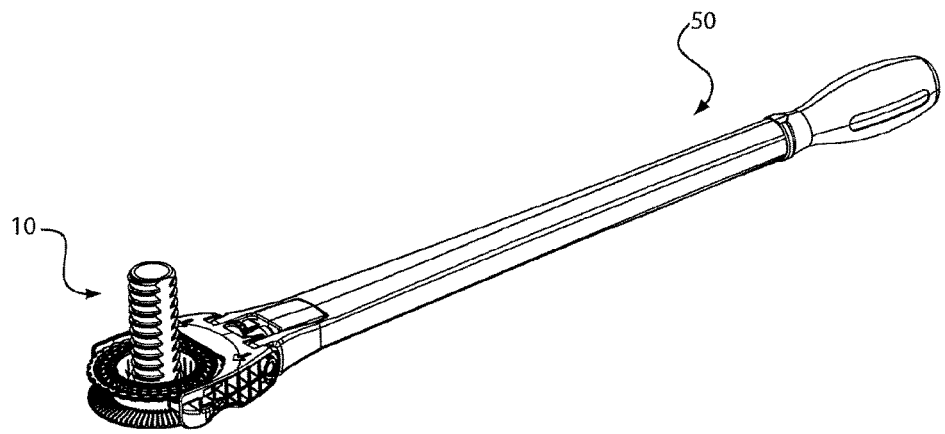
FIG. 3 is a perspective view of the foot and the corresponding tool of FIG. 1A with the tool engaged with the foot.
Figure 4:
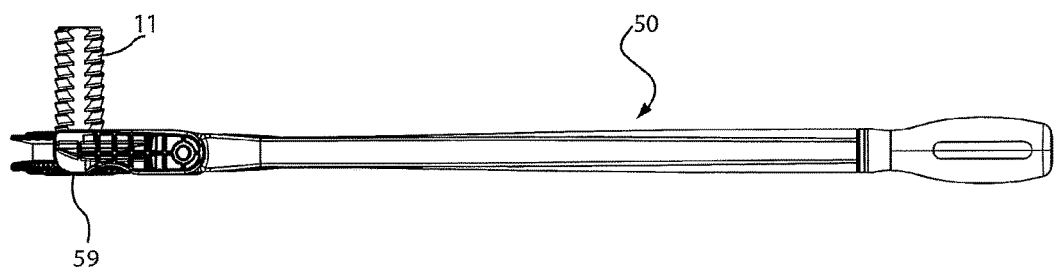
FIG. 4 is a side view of the foot and tool of FIG. 1A with the tool engaged with the foot.

Various embodiments of a foot and/or a tool for adjusting the foot are described with reference to the Figures. The same reference numerals are used throughout to designate the same or similar components in various embodiments described.

FIGS. 1A to 10 illustrate a height adjustable foot or prop and a tool for adjusting the foot or prop according to some embodiments of the present invention. The foot or prop is referred to herein as a foot for height adjustment of a cabinet, appliance or structure or other object. A person skilled in the art will understand the foot or prop could also be used for sideways support of an object, for example supporting a cabinet from a vertical wall. In some embodiments the foot 10 comprises a threaded shaft 11. In use the threaded shaft is received in a threaded socket 5 or component (for example a nut) fixed to a cabinet, appliance or structure (herein an object) or other object to be height adjusted or leveled. The foot and threaded socket together for a height adjustable leg. Rotation of the shaft 11 in the socket 5 causes the foot to move axially relative to the socket to set the height of the object supported by the leg. Typically an object will be supported on two, three, four or more height adjustable legs so that the height and level of the object may be adjusted. A base 12 of the foot contacts a floor surface or other surface supporting the object. In some embodiments the shaft 11 may be rotationally supported on the base 12, so that the base 12 rests on a floor surface or other surface supporting the object without rotation when turning the shaft for height adjustment. A low friction interface may be provided between the shaft 11 and the base 12 to allow the shaft to turn relative to the floor or supporting surface while the base remains stationary on the floor. In some embodiments the shaft may be fixed to the base 12 so that the base and threaded shaft turn together when adjusting the height of the supported object. The threaded shaft 11 may comprise a thread along its full length or part way along its length. For example, in some embodiments the threaded shaft may have a threaded portion at an end of the shaft to engage a corresponding threaded socket part. In some embodiments the threaded shaft may comprise a hollow threaded portion. That is the threaded shaft may have an internal thread to mate with a corresponding threaded shaft or male thread. In other words, in some embodiments the foot 10 may comprise a threaded socket having an internal thread to mate with a corresponding threaded shaft attached to the object being supported. An example of a foot comprising a threaded socket is illustrated in FIG. 25C.

A tool 50 is used for turning or rotating the foot to adjust the height of the object. The tool comprises a driving member 51. The foot comprises a corresponding driven member or feature 13. In the embodiment illustrated in FIGS. 1A to 10, the driving member is a pinion 51 and the driven member or feature comprises a rotary rack 13 on (fixed to) the threaded shaft.

Figure 8:
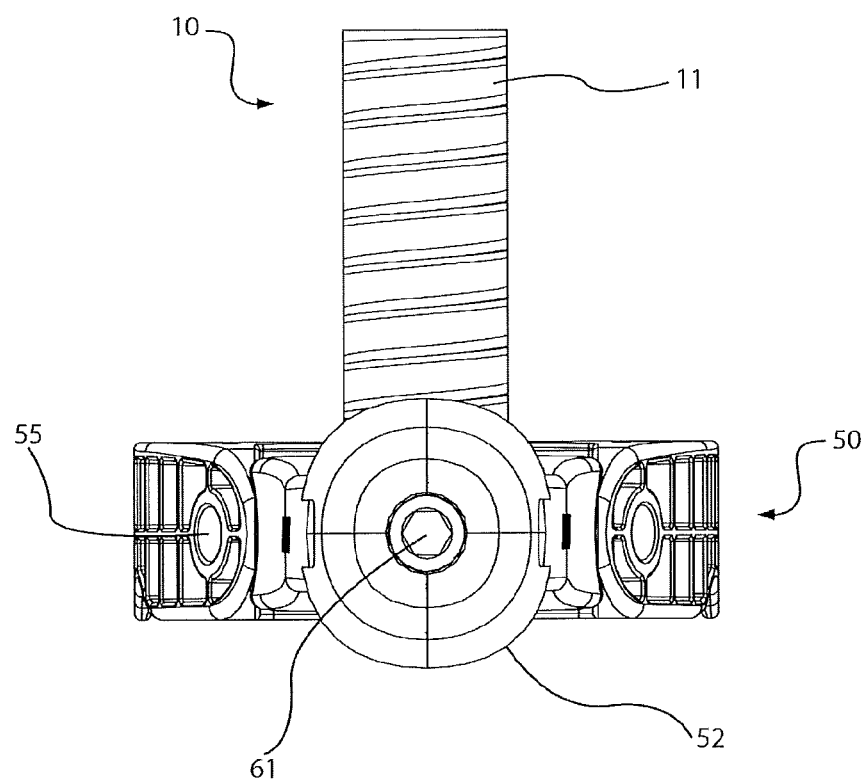
FIG. 8 is an end view of the tool of FIG. 1A on a handle end of the tool with the tool engaged with the foot.
Figure 9:
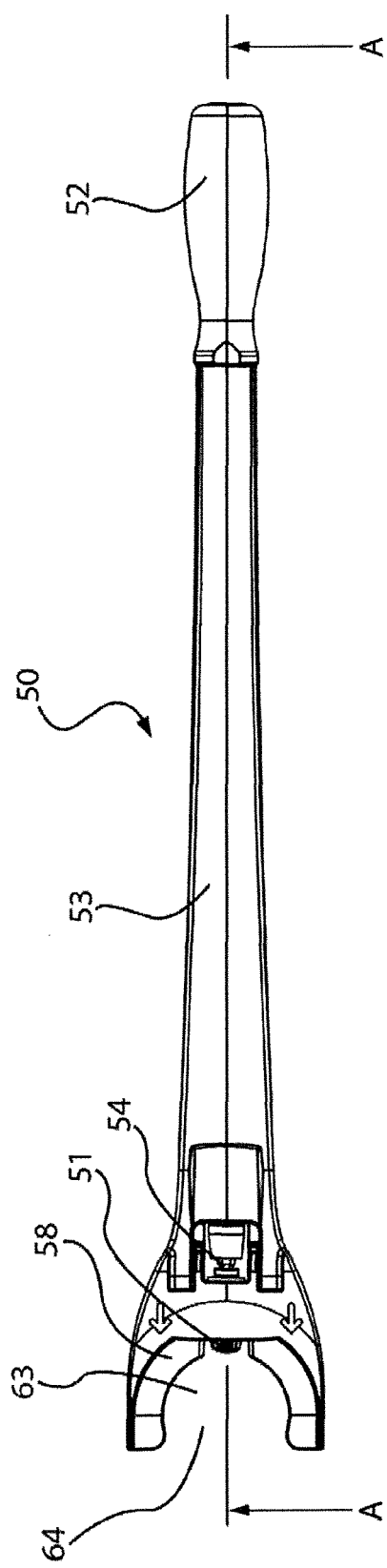
FIG. 9 is a top view of the tool of FIG. 1A.
Figure 10:
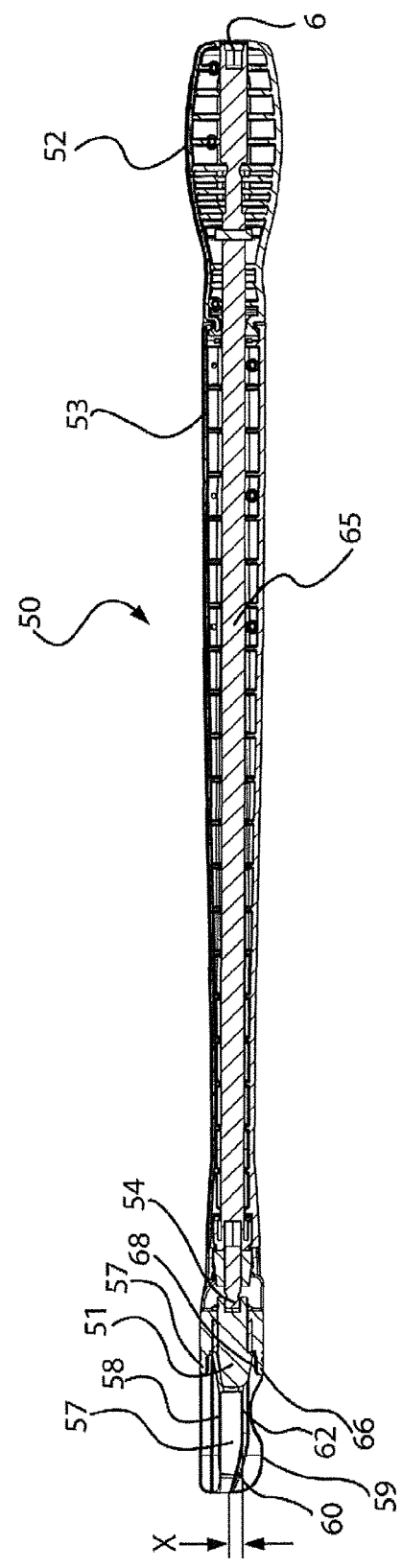
FIG. 10 is a cross sectional view of the tool of FIG. 1A on a longitudinal centre line (A-A in FIG. 9) of the tool.

In some embodiments the tool comprises a handle 52 coupled to the driving member 51 via a connecting rod 65 (shown in FIG. 10). In the illustrated embodiment the rod coupled between the handle 52 and the driving member 51 is shrouded by an arm 53 extending between the driving member 51 and the handle 52. Rotation of the handle 52 about a longitudinal axis of the handle causes rotation of the driving member 51. With the tool engaged with the foot the driving member 51 is engaged or meshed with the driven member 13 so that rotation of the handle turns the threaded shaft 11 for height adjustment. In the embodiment of FIGS. 1A to 10 the driving member rotates about a lateral axis relative to a longitudinal axis of the threaded shaft when driving the driven member or feature 13. The driving member drives the driven member to rotate the driven member about the longitudinal axis of the leg. In some embodiments the lateral axis is substantially perpendicular to the longitudinal axis of the threaded shaft. In some embodiments the lateral axis is arranged at an angle to the longitudinal axis of the threaded shaft.

Figure 5:
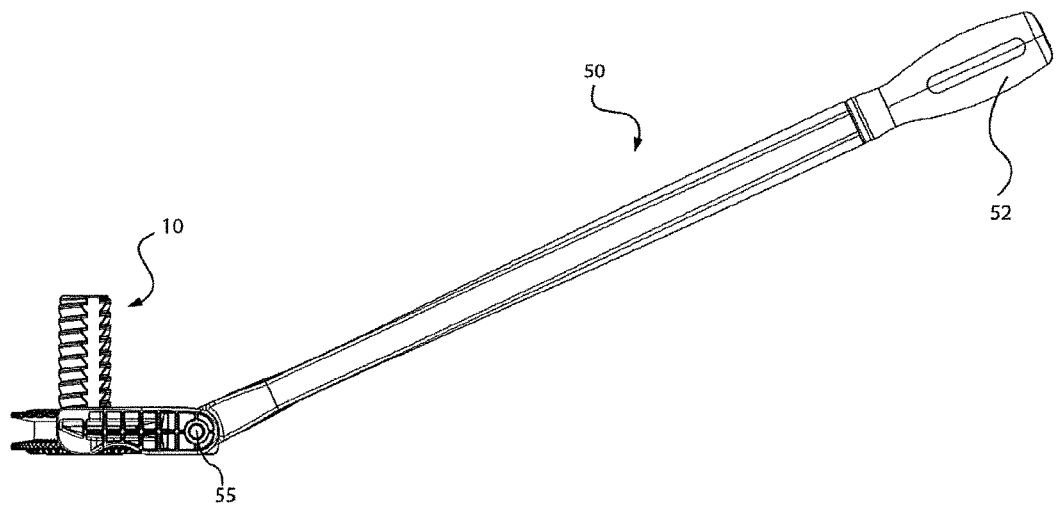
FIG. 5 is a side view of the foot and tool of FIG. 1A with the tool engaged with the foot, and with a handle of the tool articulated to a raised position.
Figure 6:
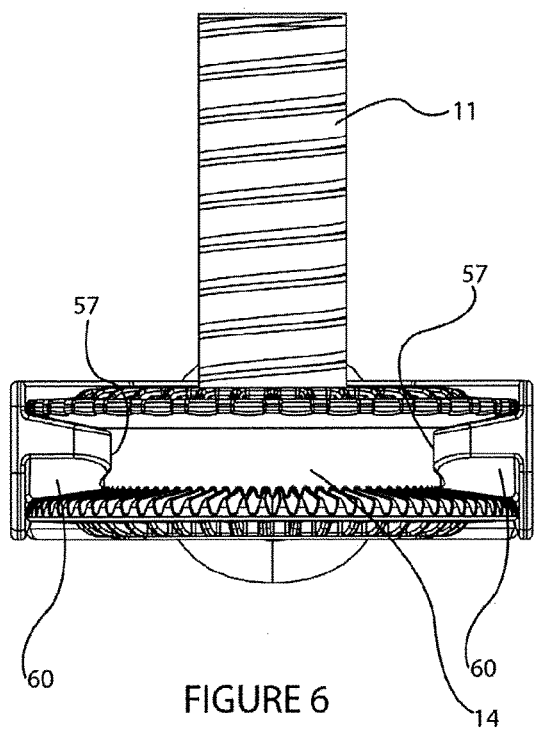
FIG. 6 is an end view of the foot and tool of FIG. 1A with the tool engaged with the foot.
Figure 7:
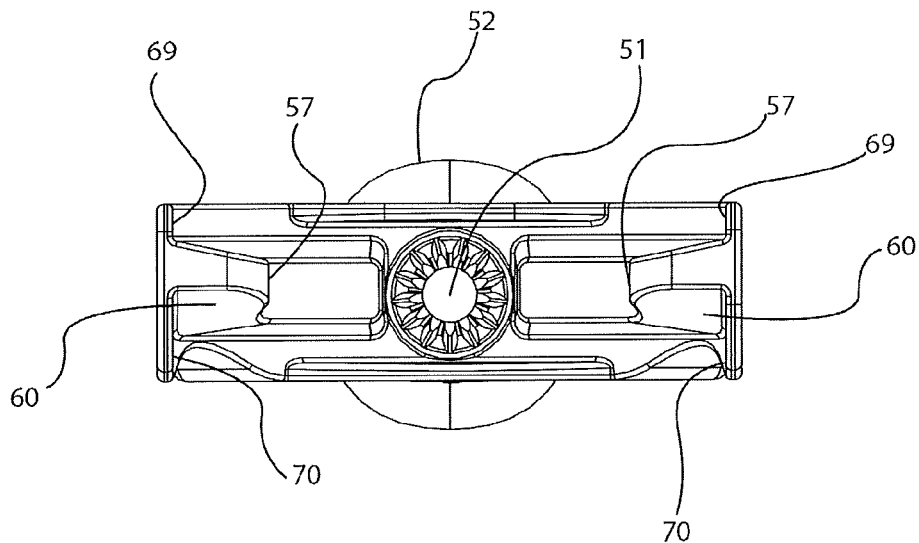
FIG. 7 is an end view of the tool of FIG. 1A on a driving member end of the tool.

In some embodiments the tool comprises a joint 54 between the handle 52 and the driving member 51 so that driving member 51 has a rotational axis able to articulate from a rotational axis of the handle 52. For example joint 54 is a universal joint. In some embodiments the articulation allows a user to move the handle up and down by rotation of the handle and arm about a substantially horizontal axis 55. This movement of the handle may ergonomically assist with use of the tool for height adjustment of the foot. Articulation between the handle and the driven member with the handle rotated about axis 55 to a raised position is illustrated in FIG. 5.

In some embodiments, the handle may be fitted with an interface for connecting an additional tool for applying torque to driving member via the handle. For example, the illustrated embodiment as shown in FIG. 8 comprises a hexagonal socket 61. A user may fit a tool such as a wrench or a power drill to the handle via the hexagonal socket to provide torque to the handle for turning the foot via the driving member. Whether a user turns the handle by hand or by a tool fitted to the handle may depend on the weight of the object being supported by the foot. The handle 52 and/or the interface 61 may be described as a torque input for applying torque to the driving member. The torque input allows a user to apply torque to the driving member, for example by hand using handle 52 wherein the handle is the torque input. In some embodiments the handle 52 is not fitted with an interface for attaching an additional tool, wherein the handle is the torque input. In some embodiments, the tool 50 does not have a handle, but comprises a torque input for attaching an additional tool to tool 50, for example interface 61. In some embodiments the handle of the tool does not rotate to turn the driving member. A user may hold the handle and rotate the driving member using an additional tool via the torque input, for example socket 61.

Other torque input examples are a slot for receiving a screw driver and a square or hexagonal male interface for being received in a female square or hexagonal socket of a drive tool.

In some embodiments the tool may be a power tool. That is, the tool may comprise an electric motor as the torque input for driving the driving member. A motor may be located in a (stationary) handle of the tool, or between the handle and the driving member.

The tool and the foot are complementarily adapted to releasably maintain engagement between the driving member 51 and the driven member or feature 13 to allow the driving member to drive the driven member or feature to rotate the shaft 11. The tool and the foot comprise complementary features to releasably maintain engagement between the driving member and the driven member when the tool is engaged with the foot. The tool and the foot comprise complementary features to releasably maintain engagement between the tool and the foot to releasably maintain engagement between the driving member and the driven member. In some embodiments, the tool and the foot comprise complementary features to assist with alignment of the tool with the foot when engaging the tool to the foot. The foot 10 may be described as a coupling or coupling part of the height adjustable leg for coupling to the tool so that the tool is releasably engaged to the height adjustable leg for height adjustment.

For lateral alignment of the tool and the foot, in some embodiments the tool comprises a lateral extension 56 for capturing or bearing against a lateral facing surface of the foot, for example surface 14. In some embodiments the tool comprises a lateral extension 56 for capturing or bearing against a lateral facing surface of the foot to releasably retain the tool to the foot in a lateral direction. For example, in the embodiment illustrated in FIGS. 1A to 10, the tool comprises two spaced apart lateral extensions 56. The lateral extensions 56 provide a jaw 63 for capturing the foot laterally to align the tool to the foot. In some embodiments, the jaw 63 captures the foot laterally to releasably retain the tool to the foot in a lateral direction to releasably maintain engagement between the driving member 51 and the driven member 13. A diameter of the foot is complementarily sized to bear against radially facing surfaces of the tool to laterally align the position of the tool correctly to the foot. For example, a diameter 14 of the foot may be complementarily sized to bear against radially inward facing surfaces 57 of the jaw 63 to laterally set the position of the tool correctly to the foot. When the tool engages with the foot the diameter 14 is received within the jaw. In the illustrated embodiment of FIGS. 1A to 10, radial facing surfaces 69 may bear against outside diameter of circular flange 16. In the illustrated embodiment of FIGS. 1A to 10, radial facing surfaces 70 may bear against an outside diameter of the driven member or feature 13. In some embodiments the tool may comprise lateral extensions 56 for engaging an outer diameter of the threaded shaft. For example, the tool lateral extensions 56 may engage the major diameter of the thread of the threaded shaft, the threaded shaft rotationally sliding on the radial facing surfaces 57 of the lateral extensions when the tool rotationally drives the foot. In some embodiments the foot may comprise a threaded socket and the lateral extensions may engage an outer diameter of the threaded socket.

Figure 11:
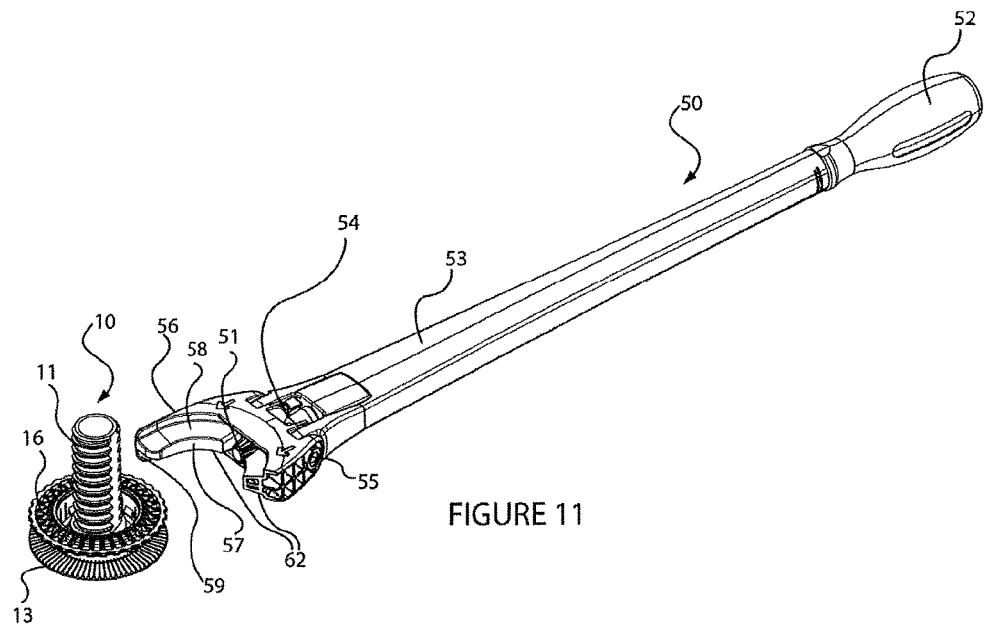
FIG. 11 is a perspective view of the foot of FIG. 1A and an alternative tool for adjusting the foot to adjust the height of an object supported by the foot.

In some embodiments the tool may comprise one lateral extension 56, as illustrated in FIG. 11. The lateral extension comprises a radially inward facing surface 57 that bears against the corresponding diameter 14 of the foot 10. In some embodiments the lateral extension 56 is provided to a side of the foot so that the radial inward facing surface 57 of the tool bears against the corresponding diameter of the foot when the tool is used to drive the threaded shaft of the foot in a direction to increase the height of the object being supported. This arrangement ensures the tool remains engaged to the foot laterally when driving the foot against the weight of the object being supported.

With reference to FIG. 9, in some embodiments the entrance 64 to the jaw 63 is narrower than the diameter 14 of the foot to which the jaw engages. In other words, in some embodiments the jaw extends around the diameter 14 of the foot by more than 180 degrees to capture the foot in the jaw when the tool is engaged with the foot. To engage the tool with the foot, the jaw elastically deflects slightly (for example lateral extensions 56 bend outwards) to allow the foot to pass through the entrance 64 of the jaw. Once the foot is received in the jaw the jaw returns to its un-deflected position or a less deflected position so that the tool is 'clipped' to the foot. To remove the tool from the foot it is necessary to apply a force to the tool to pull the tool from the foot in the direction of the arm to deflect the lateral extensions to 'unclip' the tool from the foot.

In an alternative embodiment one or both lateral extensions may pivot between an open position to allow the tool to connect with the foot, and a closed position where the jaw of the tool grabs or closes around a diameter of the foot. For example, each lateral extension may pivot about a vertical axis so that the jaw may present an open state to receive the foot. Once the foot is received in the jaw the lateral extensions are pivoted to close the jaw around the foot. The tool may be provided with an actuator to move the jaw between an open and close position. For example the actuator may comprise a rod that extends from the handle to the jaws of the tool and a mechanism to cause translational movement of the rod along the arm of the tool to rotate the lateral extensions between the open and close positions. The actuator preferably allows the jaw to be operated from the handle end of the tool.

The jaw 63 formed by lateral extensions 56 may be described as being C shaped. In some embodiments the jaw extends around diameter 14 of the foot by 180 degrees or less than 180 degrees, to capture the foot laterally to releasably retain the tool to the foot in a lateral direction to releasably maintain engagement between the driving member 51 and the driven member 13 as the driving member drives the driven member for height adjustment of the leg. The tool, although laterally coupled or secured to the foot to maintain engagement between the driven and driving members, may be released from the foot by moving the tool laterally away from the foot in the direction of the arm of the tool. The tool is laterally coupled or secured to the foot in all other lateral directions. To keep the tool engaged with the foot, a user may push the tool against the foot in the direction of the arm. In the embodiment where the jaw extends around the foot by more than 180 degrees, there is no requirement to push the tool against the foot to maintain engagement as the tool is clipped to the foot.

For axial alignment of the tool and the foot, in some embodiments the tool comprises an axially facing bearing surface 58 and the foot comprises a corresponding axially facing bearing surface 15. In some embodiments, contact between the tool and foot axial bearing surfaces 58, 15 releasably retain the tool to the foot in an axial direction to releasably maintain engagement between the driving member 52 and the driven member 13. In some embodiments contact between the axial bearing surfaces of the tool and foot holds the driving member against the driven member. In the embodiments illustrated in FIGS. 1A to 11, the axial facing bearing surface 15 is provided by a flange 16 axially spaced from the driving member or feature 13. The tool is captured axially between the flange 16 and the driving member or feature 13 to axially align the position of the tool correctly to the foot for engagement between the driving member and the driven member.

Figure 26E:
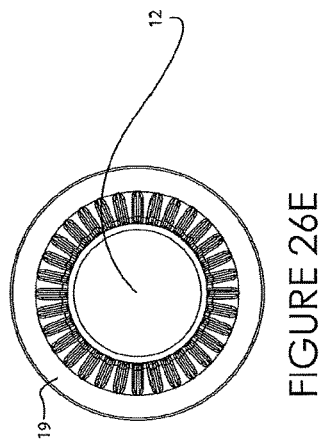
FIG. 26E is a bottom view of the foot of FIG. 26A
Figure 26B:
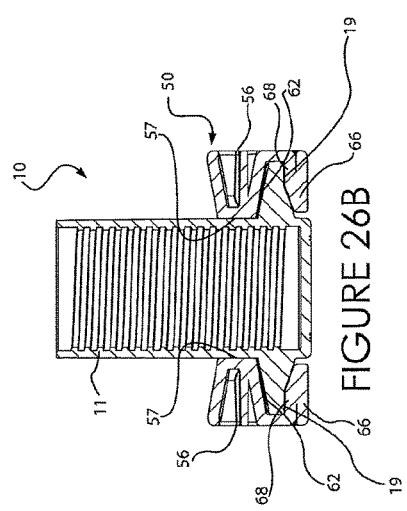
FIG. 26B is a cross sectional view of the foot and tool of FIG. 26A, the cross section being on a longitudinal centre line of the foot and lateral to the tool.
Figure 26D:
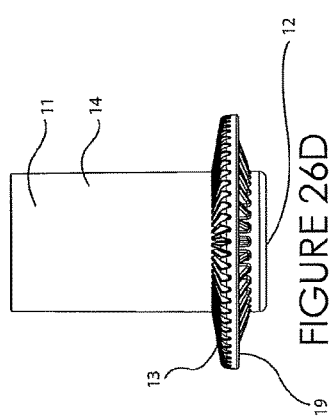
FIG. 26D is a side view of the foot of FIG. 26A.
Figure 26A:
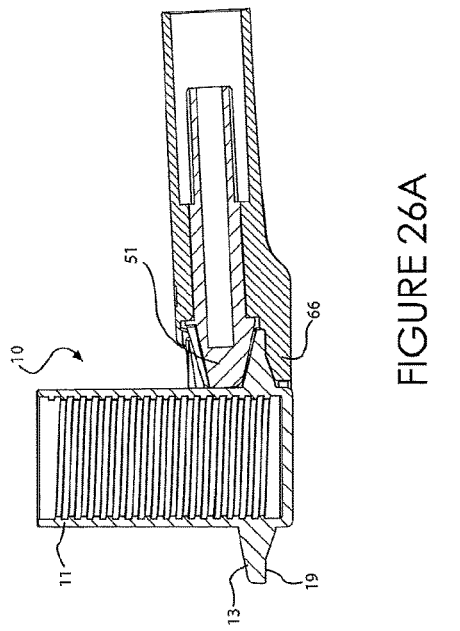
FIG. 26A is a cross sectional view of an alternative foot and portion of a tool, with the tool engaged with the foot, the cross section being on a longitudinal centre line of the tool and the foot.
Figure 26C:
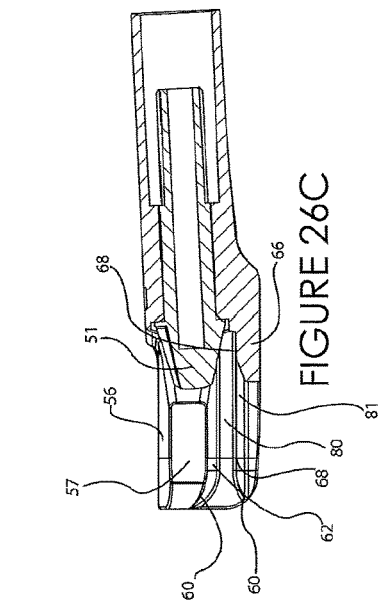
FIG. 26C shows the cross section of the tool of FIG. 26A with the foot removed.

In some embodiments, the tool comprises a first axial facing bearing surface and a second oppositely facing axial surface, for example surfaces 58 and 62. In the illustrated embodiment of FIGS. 1A to 11 the first and second axial facing surfaces are captured in a slot or channel extending circumferentially around the foot. A circumferential channel 18 in the foot is defined by the axial bearing surface 15 and the oppositely facing rotary rack 13. Surface 15 and the driven member 13 form axial sides of the channel 18. The axial facing surfaces of the tool are provided on the lateral extensions 56. When aligning the tool with the foot, the first axial facing surface 58 of the tool bears against the foot axial surface 15, and/or the second axial facing surface 62 of the tool bears against surfaces of the rotary rack 13 to axially locate the tool to the foot. Tooth tips of teeth of the rotary rack 13 form a discontinuous annular axial facing bearing surface. In some embodiments, each tooth comprises a flat portion at a tip of the tooth, as illustrated by the embodiment of FIG. 26D, the flat portions of the teeth combining to form the discontinuous axial facing bearing surface.

In some embodiments, an axial facing surface of the driving member contacts an axial facing surface of the foot to position the tool to the foot in the axial direction. For example, the pinion 51 may be captured between the rack 13 and surface 15, a tooth tip or tips of the pinion providing an axial facing bearing surface of the tool to contact surface 15 to maintain the driving member 51 in contact with the driven member 13. With the tool engaged with the foot, the driving member 51 may be axially captured between the driven member 13 and axial facing surface 15. As the pinion rotates, each tooth tip may contact the surface 15, each tooth tip providing an axial facing bearing surface as it rotates into contact with the surface 15.

In the illustrated embodiment of FIGS. 1A to 10, the driving member is located between lateral extensions 56. With the driving member 51 located in the jaw of the tool (defined by lateral extensions 56), the driving member is located within the circumferential slot or channel 18 that receives the jaw of the tool when the tool is engaged with the foot, and the driven member or feature provides an axial facing surface against which the second axial facing surface of the tool bears for axial positioning. In an alternative embodiment, the driving member 51 may be spaced axially from the jaw, so that the jaw engages with a circumferential slot or channel spaced axially from the driven member or feature 13.

In the illustrated embodiments of FIGS. 1A to 11, the driven member 13 is a circular flange comprising a rotary rack and the tool is captured axially between the driven member and the axial facing bearing surface 15 for alignment. In some embodiments, the driven member 13 may be captured between the driving member 51 and a flange extending from the tool to bear against an opposite axial side 19 of the driving member 13, for example flange 66 (best shown in FIG. 10). In some embodiments, flange 66 of the tool provides a back support for the driven member or feature. Where the object (for example a cabinet) being supported by the foot is heavy, torque transmitted from the driving member to the driven member may produce a force acting to deflect the driven member 13 away from the driving member and out of engagement, or the driving member may tend to lift off the driven member or feature. The flange 66 may support the back or opposite side 19 of the driven member 13 to keep the driven member or feature 13 in contact with the driving member 51. In some embodiments, with the tool engaged with the foot, the driven member 13 is captured between the lateral flange 66 of the tool and the driving member 51. In some embodiments, flange 66 provides an axial facing bearing surface 68 to contact corresponding axial facing surface 19 of the foot to releasably maintain engagement between the driving member and the driven member or feature in an axial direction.

In some embodiments as described above, the tool is thus axially coupled to the foot in both axial directions. For example the tool cannot lift away from the foot. The tool is released from the foot by pulling the tool laterally away from the foot. That is, to disengage the tool from the foot, the tool is moved radially away from the foot. To disengage the tool from the foot a user only needs to move the tool laterally/radially away from the foot without requiring the user to move the tool axially relative to the foot. For example, the user does not need to lift the tool off the foot before pulling the tool laterally away from the foot. Lifting the tool off the foot can be a difficult or cumbersome task when disengaging the tool from a foot at the rear of a cabinet or other object being supported. Also, with low toe-kick height designs for cabinetry which are becoming increasingly popular (and also often involve obstacles such as plumbing), there is limited or no height clearance making lifting the tool off the foot even more difficult.

In some embodiments such as the embodiment illustrated in FIGS. 1A to 10, the tool comprises a lateral member 56 that engages a circumferentially extending slot or channel 18 in the foot for axial positioning. In some embodiments, the foot may comprise a disc or circular flange coaxial with the threaded shaft to be received in a corresponding recess or slot in the tool. For example, the driven member or other flange may be received in a horizontal slot of the tool. For example, in some embodiments, a slot may be formed between surface 58 and flange 67 for receiving flange 16 of the foot 10. In some embodiments, flanges 66 and 67 (best shown in FIG. 10) of the tool may locate on surfaces 19 and 20 of the foot to position the tool relative to the foot in the axial direction. In some embodiments, the tool flanges 66 and 67 provide a first axial facing bearing surface and a second opposite axial facing bearing surface to bear corresponding axial facing bearing surfaces 19 and 20 of the foot. Contact between the tool and foot axial facing bearing surfaces releasably retains the tool to the foot in an axial direction to releasably maintain engagement between the driving member and the driven member or feature. In some embodiments, axial facing surface 62 may provide a guiding surface to bring the driving member and the driven member or feature into initial contact, and surface 68 and surface 19 releasably maintaining engagement between the driving member and the driven member or feature once the driving member and the driven member or feature are engaged.

In the illustrated embodiment, the driven member or feature 13 being a rotary rack is positioned to face upwardly. For a right hand threaded shaft, this arrangement ensures that right hand turning (clockwise) of the handle 52 of the tool works to lift the height of the object being supported. In an alternative embodiment the rotary rack may be positioned to face downwards, so that left hand turning of the handle works to raise the supported object. In a further alternative, the threaded shaft may comprise a left hand thread. With the rotary rack facing downwards and a left hand threaded shaft, right hand turning of the handle works to raise the object. The inventor considers that right hand turning of the tool handle for raising the object is a preferred arrangement as right hand turn of the handle to lift the object may be considered to be intuitive by a user. In yet another alternative, the threaded shaft may comprise a left hand thread, and the rack may face upwards so that left hand turning of the of the handle works to raise the supported object.

In the embodiments illustrated in FIGS. 1A to 11, the driven member or feature 13 is fixed to or on the shaft 11 so that the driven member or feature remains at a fixed height relative to a floor surface or other surface on which the foot is to be positioned when the foot is supporting the weight of the object on the floor surface or other surface. For example, in some embodiments the driven member may be integrally formed with the shaft, or may be attached to the shaft. For such an arrangement, in some embodiments the tool comprises a positioning feature or features for setting the driving member at a height relative to the floor surface or other surface so that the driving member is positioned axially relative to the foot for engagement with the driven member, the height of the driven member and height of the driving member both being referenced from the floor surface or other surface. For example, in the embodiment of FIGS. 1A to 10, the tool comprises guides 59 that contact the floor surface to present the tool at the correct height or axial position relative to the foot for engagement with the foot.

The guides 59 or axial positioning features may provide an initial alignment of the tool to the foot. The tool may comprise ramp features 60 (best shown in FIG. 10) to accommodate some vertical misalignment between the foot and the tool. For example, in a particular installation, prior to adjustment a foot may be raised off the floor surface so that correct axial positioning of the tool relative to the foot is not initially provided by guides 59. Guiding axial alignment between the tool and the foot and therefore between the driven member and the driving member is preferably provided by the ramp features bearing against an axial bearing surface of the foot. For example, in the embodiments illustrated in FIGS. 1A to 10, the ramps or cam surfaces 60 make sliding contact with the rotary rack to lift or guide the tool into correct axial position with the foot, even when the foot is initially raised slightly off the floor surface. In the illustrated embodiment of FIGS. 1A to 10, the ramp or cam surface 60 provides axial alignment of distance X indicated on FIG. 10. If foot 10 was initially raised off the floor by distance X, with the tool supported on guides 59 on the floor, as a user pushes the tool into the foot, cam surface 60 will contact the foot and guide the tool to the correct axial position defined by axial facing surface 62. In some embodiments the ramp surface and the axial facing surface 62 are continuous.

Figure 12:
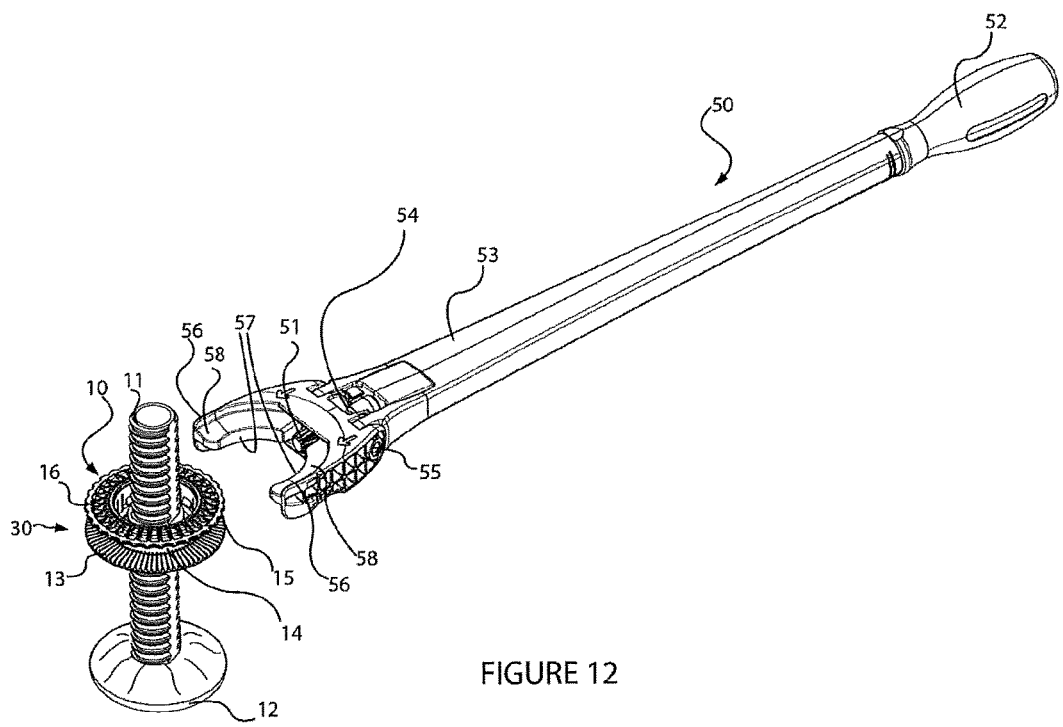
FIG. 12 is a perspective view of an alternative foot and the tool of FIG. 1A for adjusting the foot to adjust the height of an object supported by the foot.
Figure 16:
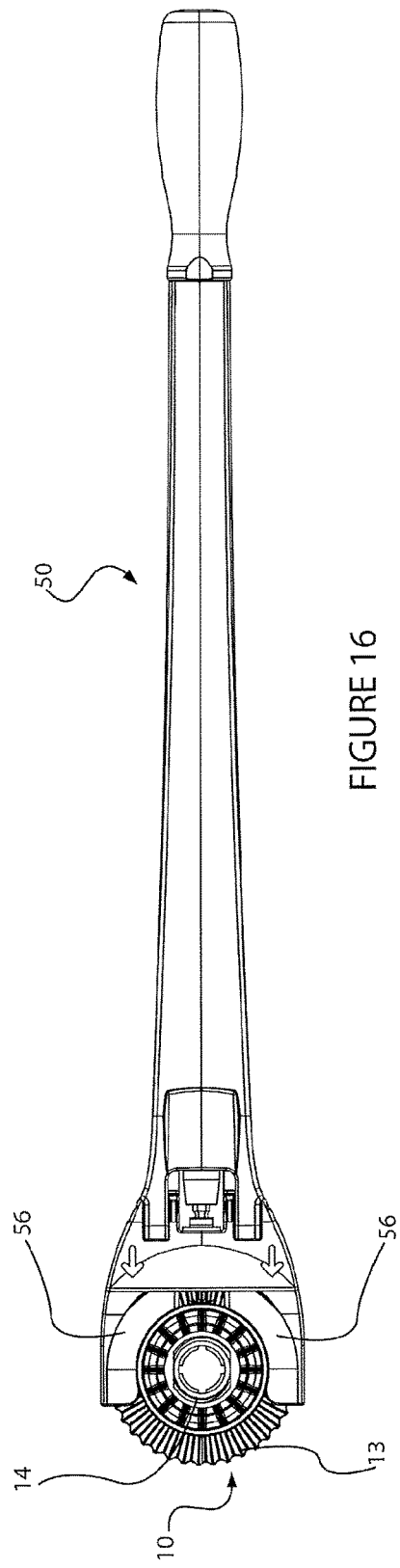
FIG. 16 is a top view of the foot and the tool of FIG. 13A with the tool engaged with the foot.

In some embodiments, as illustrated in FIG. 12, the threaded shaft is received in a threaded component 30 that is adapted to remain at a fixed height relative to the object being supported by the foot. The threaded component 30 is free to rotate relative to the object being supported. In some embodiments the threaded component 30 forms part of a foot assembly 10 or height adjustable leg assembly. The threaded shaft 11 is adapted to be rotationally fixed to the object being supported. For example, the shaft may be provided with a flat longitudinal surface 17 or surfaces to mate with a socket (not illustrated) attached to or formed with the object supported by the foot, the socket comprising a corresponding flat surface or surfaces. A height adjustable leg assembly may comprise the shaft 11, corresponding socket (not shown) and the threaded component 30. In such an embodiment the threaded component 30 comprises the driven member or feature 13, to be driven by the tool to adjust the relative axial positions of the threaded shaft and the threaded component. For example, as shown in FIG. 12, the threaded component may comprise a rotary rack 13 to be driven by the driving member 51 of the tool 50, as described above. The threaded component 30 may be described as a coupling or coupling part of the height adjustable leg for coupling to the tool so that the tool is releasably engaged to the height adjustable leg for height adjustment.

In the embodiment of FIG. 12, the position of the threaded component 30 is not fixed relative to the floor surface or other surface supporting the base 12 of the foot. The threaded component raises or lowers with the supported object as the foot is adjusted by the tool for height adjustment. In this embodiment, the tool 50 does not locate axially off the floor surface for initial alignment with the foot, as described for the embodiment of FIGS. 1A to 10. Final axial and lateral alignment of the tool and the threaded component may be achieved in the same way as described with reference to the embodiment of FIGS. 1A to 10.

By way of example the foot 10 has been described above as comprising a threaded shaft 11. For example the driven member 13 may be integrally formed with the threaded shaft, or may be attached or releasably attached to the shaft. In some embodiments, the foot may be provided without or separate to a threaded shaft 11. For example, a height adjustable leg for supporting a cabinet, appliance or structure may comprise a threaded shaft 11, and a foot according to some embodiments of the present invention may be adapted to be attached, fixed or fitted to an end of the threaded shaft. For example, as shown in FIG. 13A, a foot 10 according to some embodiments of the present invention may comprise the driven member 13 and an interface detail for fitting the foot 10 to a shaft 11. In the illustrated embodiment shown in FIG. 13A the interface feature is a socket. The foot comprises the socket 101 for receiving an end 111 of the threaded shaft to attach the foot to the end of the shaft. The shaft may form part of a height adjustable leg for supporting the cabinet, appliance or structure, and the foot is adapted to be fitted to the height adjustable leg. For example, a height adjustable leg may comprise threaded shaft 11 and a threaded socket 5 or component adapted to be attached or fixed to the cabinet or structure or other object to be supported. In the embodiment illustrated in FIG. 12, the threaded component 30 may be called a foot. The foot 30 supports a cabinet or other object on the threaded shaft 11. The threaded shaft provides a leg on which the cabinet or object is supported via the foot 30.

Further embodiments are described with reference to FIGS. 13A to 24. In the embodiment of FIG. 13A, the foot 10 may be described as a coupling or coupling part of a height adjustable leg for coupling to the tool so that the tool is releasably engaged to the height adjustable leg for height adjustment. As described above with reference to FIGS. 1A to 11, in some embodiments the axial position of the tool relative to the foot or coupling may be set by a flange extending from the tool that bears against an opposite axial side 19 of the driving member 13, for example flange 66, as best shown in FIG. 10. FIG. 13A illustrates an embodiment that also comprises a flange 66 that bears against the back side 19 of the driven member. In some embodiments the driven member 13 may be captured axially between the driving member 51 and the flange 66. In some embodiments the driven member may be captured between the flange 66 bearing against a back side 19 of the driven member and a second axial surface 62 (best illustrated in FIG. 19) bearing against surfaces of the rotary rack 13 to axially locate the tool to the foot. Tooth tips of teeth of the rotary rack 13 may form a discontinuous annular axial facing bearing surface. In the embodiment of FIGS. 13A to 21, the flange 66 provides a back support for the driven member 13. Transmitting torque from the driving member to the driven member may produce a force that acts to deflect the driven member 13 away from the driving member and out of engagement, or the driving member may lift off the driven member or feature. In the embodiment of FIGS. 13 to 21, the flange 66 supports the back or opposite side 19 of the driven member 13 to keep the driven member or feature 13 in contact or engaged with the driving member 51.

With the tool engaged with the foot, the driven member 13 is captured between the lateral flange 66 of the tool and the driving member 51, or between the lateral flange 66 and the axial surface 62 bearing against the rotary rack. The flange 66 provides an axial facing bearing surface 68 to contact corresponding axial facing surface 19 of the foot to releasably maintain engagement between the driving member and the driven member or feature in an axial direction. The axial facing surface 19 of the foot may be a discontinuous surface. For example, the back side of the driven member may comprise radial ribs for strength. The ribs may bear against the bearing surface 68 of the tool as the foot rotates when driven by the driving member of the tool. As shown in FIG. 13B, the foot 10 may be provided without the upper flange 15 of the foot illustrated in FIG. 2 as the axial alignment of the tool to the foot in FIG. 13A is provided by the driven member 13 being received between the driven member and/or axial surface 62 and the flange or back support 66. The flange 66 contacts the back side of the driven member with the tool engaged with the foot at least at an angular position at which the driving member engages the driven member, to prevent the rotary rack flexing away from the pinion, or the pinion lifting off the rotary rack. Preferably the flange engages the back side of the rack at a perimeter portion of the back side of the rack. In some embodiments the flange supports a substantial portion of the back side of the driven member. For example, the flange 66 may contact more than 50% of the back side of the rotary rack. Preferably the back support 66 contacts the back of the rack by 180 degrees or more around the rack.

Figure 19:
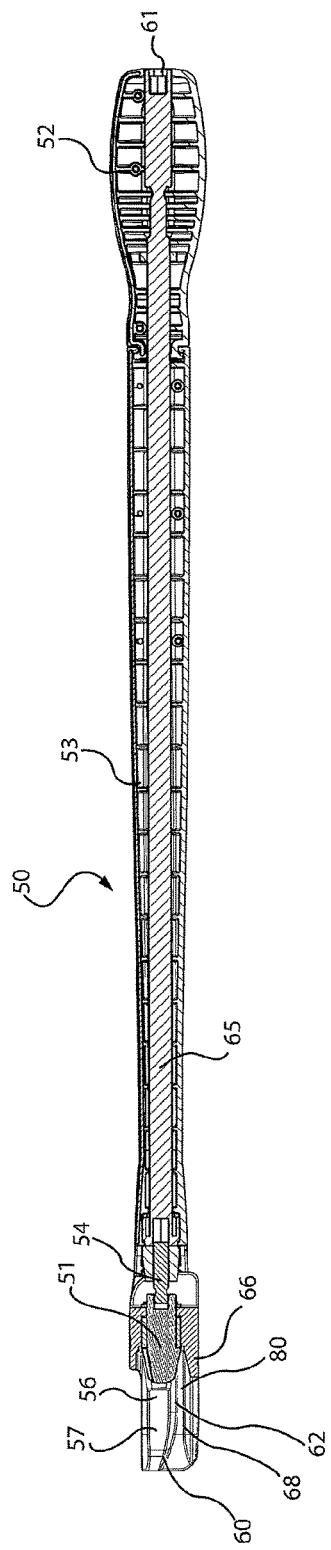
FIG. 19 is a cross sectional view of the tool of FIG. 13A on a longitudinal centre line of the tool.
Figure 21:
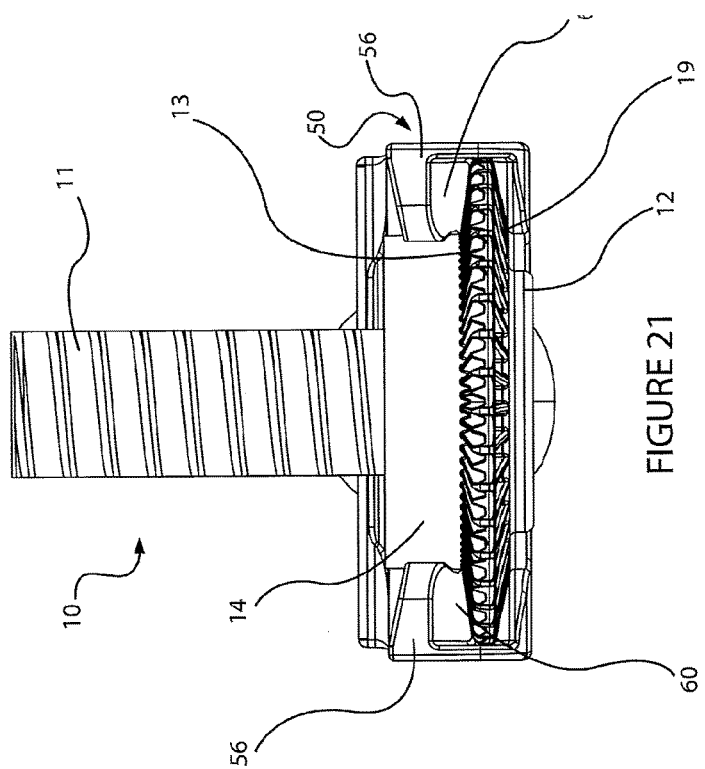
FIG. 21 is an end view of the foot and tool of FIG. 13A with the tool engaged with the foot.
Figure 20:
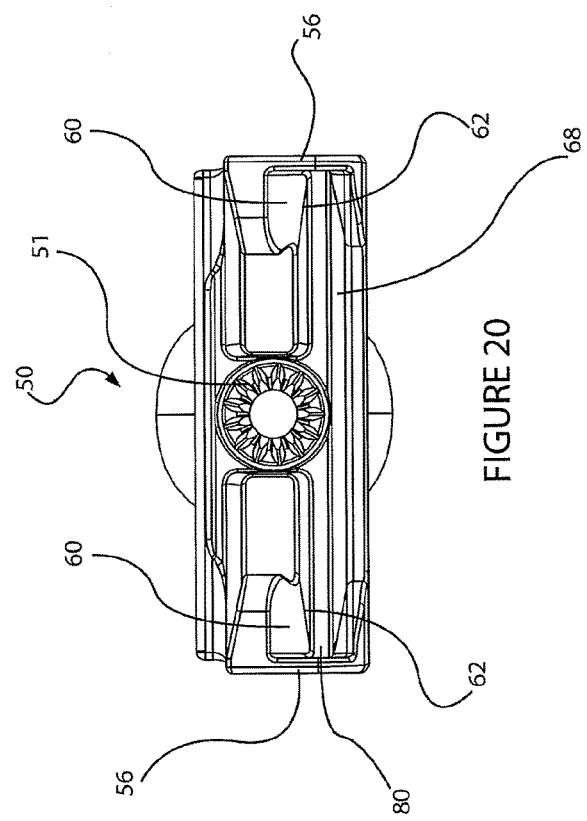
FIG. 20 is an end view of the tool of FIG. 13A on a driving member end of the tool.
Figure 23:
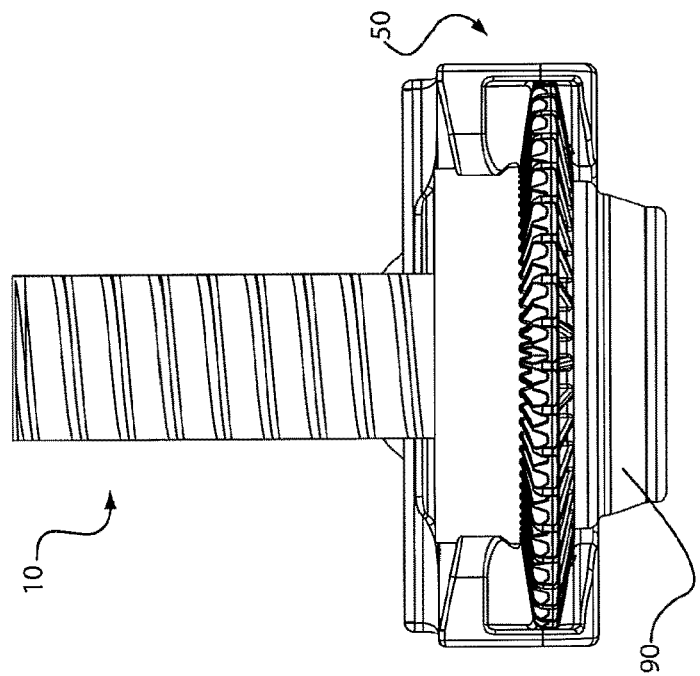
FIG. 23 is an end view of the foot and tool of FIG. 13A with the tool engaged with the foot and with the spacer shown in FIG. 22 attached to the base of the foot.
Figure 22:
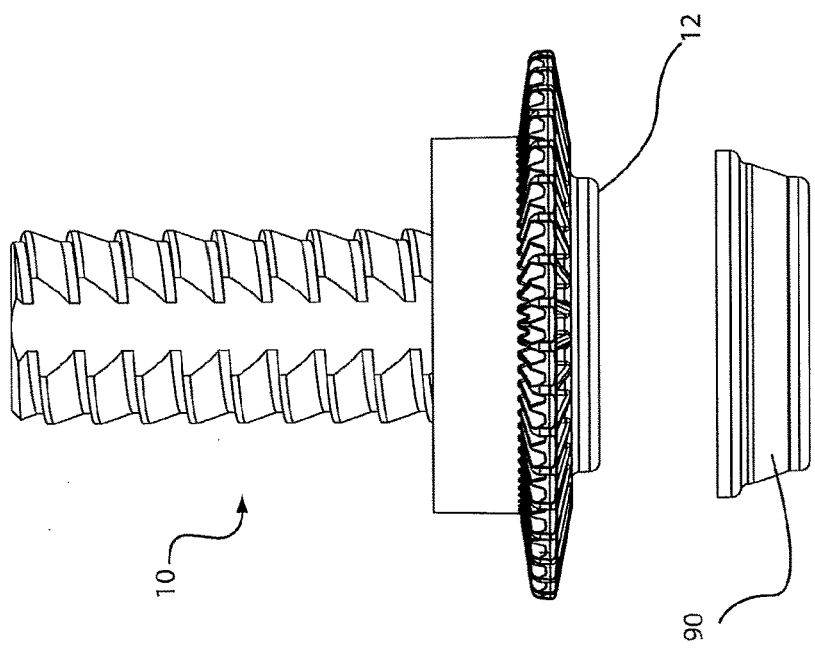
FIG. 22 is a side view of the foot illustrated in FIG. 13B and with a spacer shown spaced from the base of the foot.
Figure 24:
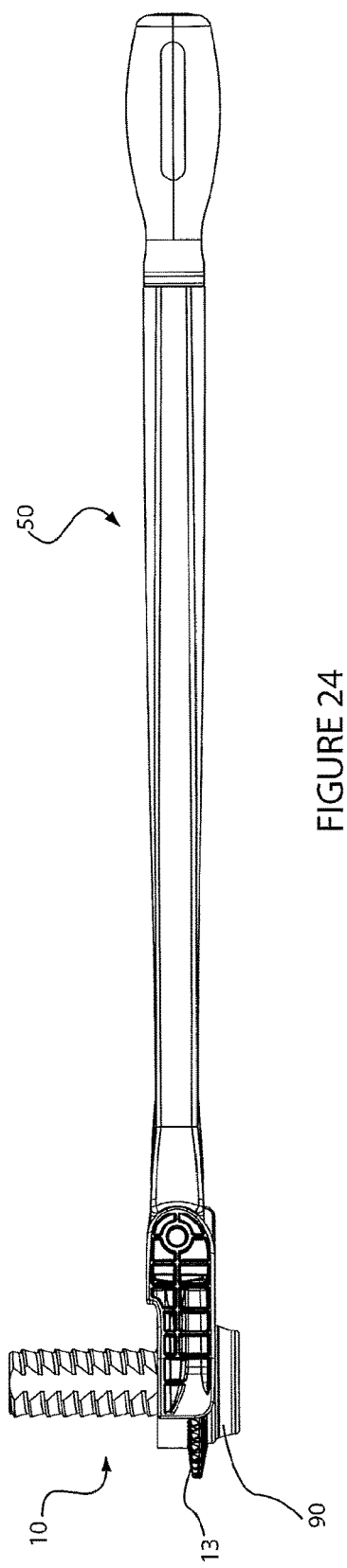
FIG. 24 is a side view of the foot and the tool of FIG. 13A with the tool engaged with the foot and with the spacer shown in FIG. 22 attached to the base of the foot.

As shown in FIGS. 19 and 20, in some embodiments the tool comprises a first axial facing surface 68 and a second axial facing surface 62. When aligning the tool with the foot, the first axial facing surface 68 of the tool may bear against the back side 19 of the driven member and the second axial facing surface 62 of the tool may bear against surfaces of the rotary rack 13 to axially locate the tool to the foot. The first and second axial facing surfaces 68, 62 face together to form sides of a slot or channel 80. The driven member 13 is received in the slot 80 and contacts the axial surfaces 68, 62 to position the tool axially to the foot. In some embodiments the surfaces 68, 62 each have a ramp surface 60 at an opening of the slot of channel to provide converging surfaces extending into the slot to assist with aligning the tool to the foot to ensure correct engagement between the rack and pinion.

In some embodiments, the axial distance between the axial facing surfaces 62, 68 may be greater than the axial thickness of the driven member 13, such that the slot 80 allows for some axial misalignment between the foot and the tool. Final alignment of the tool to the foot and engagement of the driving member to the driven member may be achieved by the first axial surface 68 acting on the back side of the rack to pull the driving member 51 onto the driven member 13. With the driving member engaged with the driven member a gap may exist between the driven member and axial facing surface 62.

In the embodiment illustrated in FIGS. 13A to 24, in use the driven member or feature 13 is fixed or attached to or on the shaft 11 so that the driven member or feature remains at a fixed height relative to a floor surface or other surface on which the foot is to be positioned when the foot is supporting the weight of the object on the floor surface or other surface. For such an arrangement, in some embodiments the tool comprises a positioning feature or features for setting the driving member at a height relative to the floor surface or other surface so that the driving member is positioned axially relative to the foot for engagement with the driven member, the height of the driven member and height of the driving member both being referenced from the floor surface or other surface. For example the tool comprises guides or sides 59 that contact the floor surface to present the tool at the correct height or axial position relative to the foot for engagement with the foot. The lateral extensions 56 may act as the guides, a bottom surface of the lateral extension 56 contacts the surface supporting the base of the foot to set the tool at an appropriate height to engage the foot.

The guides 59 or axial positioning features may provide an initial alignment of the tool to the foot. The tool may comprise ramp features 60 (best shown in FIG. 20) to accommodate some vertical misalignment between the foot and the tool. For example, in a particular installation, prior to adjustment a foot may be raised off the floor surface so that correct axial positioning of the tool relative to the foot is not initially provided by guides 59. Guiding axial alignment between the tool and the foot and therefore between the driven member and the driving member is preferably provided by the ramp features bearing against an axial bearing surface of the foot. For example, the ramps or cam surfaces 60 make sliding contact with the rotary rack to lift or guide the tool into correct axial position with the foot, even when the foot is initially raised slightly off the floor surface.

Figure 17:
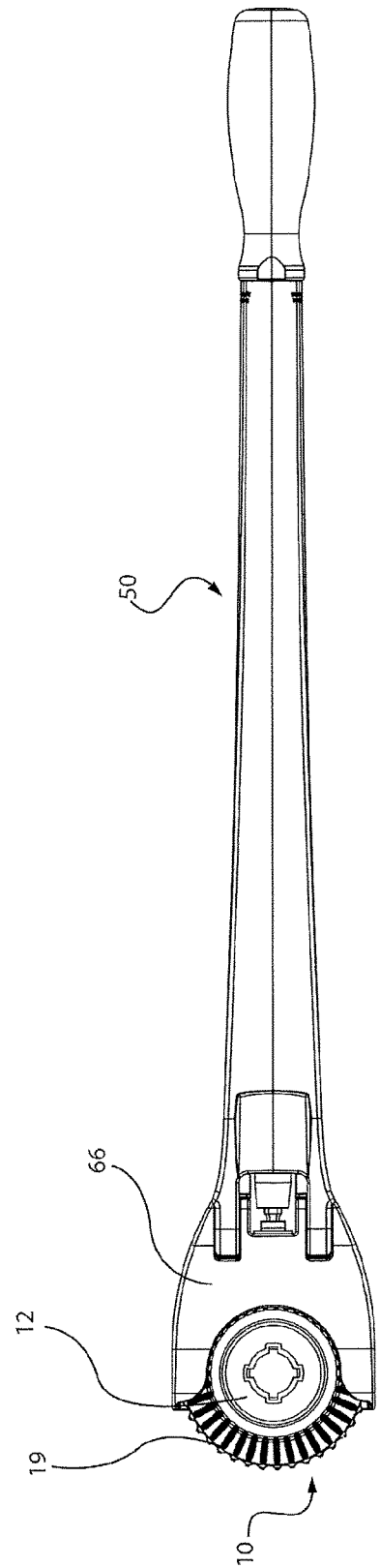
FIG. 17 is a bottom view of the foot and the tool of FIG. 13A with the tool engaged with the foot.
Figure 18:
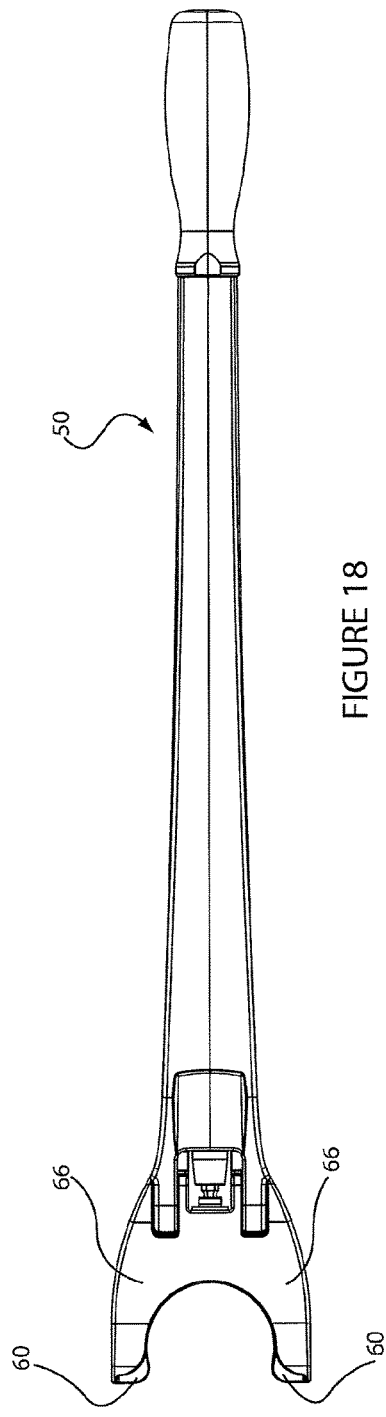
FIG. 18 is a bottom view of the tool of FIG. 13A.

For the back support flange 66 to pass underneath or behind the driven member the driven member 13 is spaced from the base 12 of the foot as shown in FIG. 13B, so that a gap is provided between the surface on which the base of the foot sits and the back side 19 of the driven member. In some embodiments, as shown in FIG. 17 the back support flange 66 may be approximately C shaped to fit around the base 12 of the foot. In some embodiments the back support flange is approximately C shaped and extends round the base and the driven member by more than 180 degrees. In some embodiments the C shaped back support flange 66 may act as a lateral jaw to capture a diameter of the coupling to laterally position the tool to the foot from the base 12 of the foot, in a similar way to the way in which the jaw 63 formed by lateral extensions 56 fits around diameter 14 of the foot described with reference to the embodiment of FIGS. 1A to 10. In the illustrated embodiment an upper jaw is provided by the lateral extensions 56 and a lower jaw is provided by the flange 66. A benefit of having two axially spaced jaws is that the jaws prevent twisting or bending of the foot, or prevent the tool twisting relative to the foot when driving the foot for height adjustment. Preferably the foot and tool and complementarily sized so that there is a small clearance between each jaw and the diameter or diameters of the foot that the jaws grab around. For example, preferably the radial clearance between the radial face of each jaw and the foot is less than 1 mm. In some embodiments jaw 62 is clamped onto the diameter of the foot. For example the lateral extensions 56 of the jaw may be slightly flexed outwardly with the tool coupled to the foot.

In some embodiments the tool may comprise two jaws for laterally positioning the tool to the foot, the two jaws spaced axially apart. In some embodiments the tool may comprise a first jaw positioned on one axial side (for example above) the driven member and a second jaw positioned on the other axial side (for example below) the driven member.

In some embodiments the foot may be provided with a base spacer 90. Such a spacer may be useful where the foot 10 is supporting an object from a surface that is soft, for example a carpeted floor. Where the foot sits on a carpeted floor or other soft surface, the weight of the object being supported by the foot may push the foot down into the carpet or soft surface such that the tool does not correctly align vertically with the foot when attempting to engage the tool to the foot. In such an installation, the spacer attached to the base of the foot takes up vertical displacement of the foot into a soft surface so that the foot and driven member is positioned at a correct vertical height for the tool to engage the foot so that the driving and driven member engage. In some embodiments the spacer is a cap that attaches to the base. The spacer may clip onto or over the base. For example an outer diameter or perimeter of the base may be received in an inner diameter of the spacer. The inventor has found that a spacer height of about 10 mm to 15 mm can be useful for use on a carpeted surface to assist with ensuring the foot is a suitable height for interfacing with the tool. In some installations a spacer may be useful where the foot is supporting an object from a floor surface below an adjacent surface level on which the tool may be positioned. For example, a cabinet may be supported by a foot on a concrete floor. Adjacent to the cabinet the concrete floor may be covered with a floor overlay such as floor boards. In this example, the spacer may be used to raise the foot 10 by the thickness of the floor boards so that the tool positioned on the floor boards may reach the foot at the correct height. In some embodiments, the spacer may have a height of about 10 mm to 20 mm. In some embodiments a range of spacers may be provided, each spacer of a different height to suit different floor surface softness or to account for a height difference between adjacent floor surfaces. For example a plurality of spacers may be provided in the height range of 5 mm to 20 mm. For example there may be a height difference of 0.5 mm or 1 mm between spacers in a plurality of spacers.

In the described embodiments the foot may be described as a coupling that forms part of a height adjustable leg assembly. The foot or coupling forms part of a height adjustable leg assembly and couples the tool to the height adjustable leg assembly. The tool 50 and the coupling 10, 30 are complementarily adapted to releasably maintain engagement between the driving member and the driven member or feature to allow the driving member to drive the driven member or feature to rotate the coupling about a longitudinal axis of the leg for height adjustment of the leg. For example, the foot 10 of FIG. 1 comprising the threaded shaft may be described as a coupling. Similarly the foot or threaded component 30 of FIG. 12 and the foot 10 of FIG. 13A (that is adapted to be attached to shaft 11) each may be described as a coupling for releasably coupling the tool 50 to the leg to releasably maintain engagement between the driving member and the driven member.

In the illustrated embodiments the coupling takes the weight of the object being supported by the height adjustable leg. In some embodiments the coupling may not take any load or weight of the object being supported by a height or length adjustable leg. For example, with reference to the embodiment of FIG. 13A, a height adjustable leg may comprise a threaded shaft 11, a corresponding threaded socket as described above (e.g. item 5 in FIG. 1A), and a coupling 10 fitted (fixed) to the threaded shaft part way along the threaded shaft 11 (for example a short distance from a bottom end of the threaded shaft) so that the coupling does not contact the floor surface supporting the object on the leg. An end or base of the threaded shaft may contact the floor surface to support the weight of the object being supported by the leg.

Further embodiments are described with reference to FIGS. 25A to 25C. In the embodiment of FIGS. 25A to 25C the foot or coupling 10 comprises a driven member 13 integrally formed with a threaded socket 11. The threaded socket engages a threaded shaft (for example threaded shaft 5 shown in FIG. 25C) attached to the object being supported by the foot. The tool of FIGS. 25A to 25C comprises a handle 52 as a torque input and may also include a torque input 61 for engaging another tool as described earlier. The driving member 51 of the tool 50 and the torque input 52 are fixed together to rotate only on a lateral axis 115 relative to the longitudinal axis 116 of the leg. That is, in some embodiments as illustrated in FIGS. 25A to 25C, there is no articulation between the torque input 52, 61 and the driving member 51.

Where there is no articulation between the torque input 52, 61 and the driving member 51 such that the driving member and the torque input rotate only on the same lateral axis 115, preferably the lateral axis is at an angle to the longitudinal axis of the leg when the driving member and driven member are engaged. For example, as best illustrated in FIG. 25C, with the driving member 51 engaged with the driven member 13, the lateral axis 115 (which may be a longitudinal axis of the tool 50) is arranged at an angle to the longitudinal axis 116 of the leg. In other words, with the tool engaged with the foot 10, the longitudinal axis of the tool on which the driving member and torque input rotate is at an angle to the longitudinal axis of the leg.

Without articulation between the driving member and torque input, preferably the lateral axis on which the driving member and torque input rotate is at an angle so that the torque input (for example handle) is raised from the floor surface or other surface on which the foot rests. With the lateral axis at an angle, the handle 52 is raised from the floor surface so that a user can grab the handle or manipulate the torque input more easily than if the torque input was against or closer to the floor.

In some embodiments the lateral axis on which the driving member and torque input rotate is at an angle (100 in FIG. 25C) of 80 to 88 degrees, or 85 to 88 degrees, or 86 to 88 degrees, or 87 to 88 degrees. In a preferred embodiment the angle may be about 87.5 degrees.

As described earlier with reference to other embodiments, the tool comprises lateral extensions 56 to laterally engage with a diameter of the coupling 10. In the embodiment of FIGS. 25A to 25C the tool laterally engages to an external diameter of threaded socket 11.

Figure 25D:
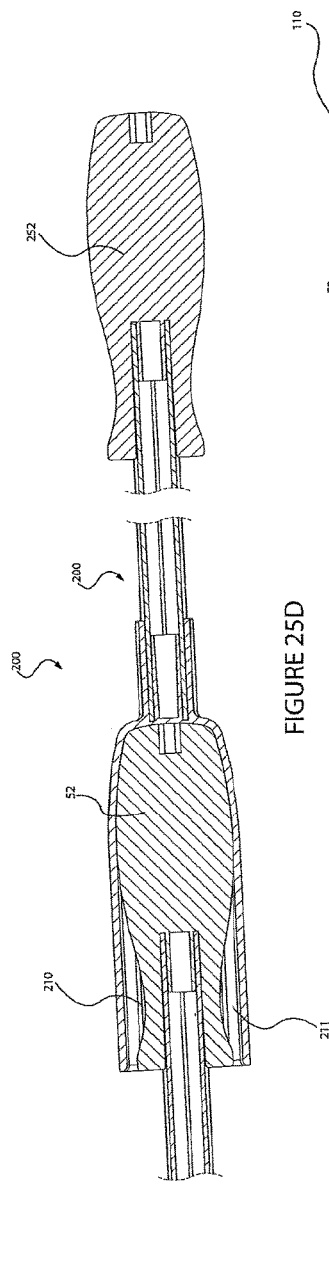
FIG. 25D is a part cross sectional view of a handle extension fitted to a handle of the tool of FIG. 25A.
Figure 25E:
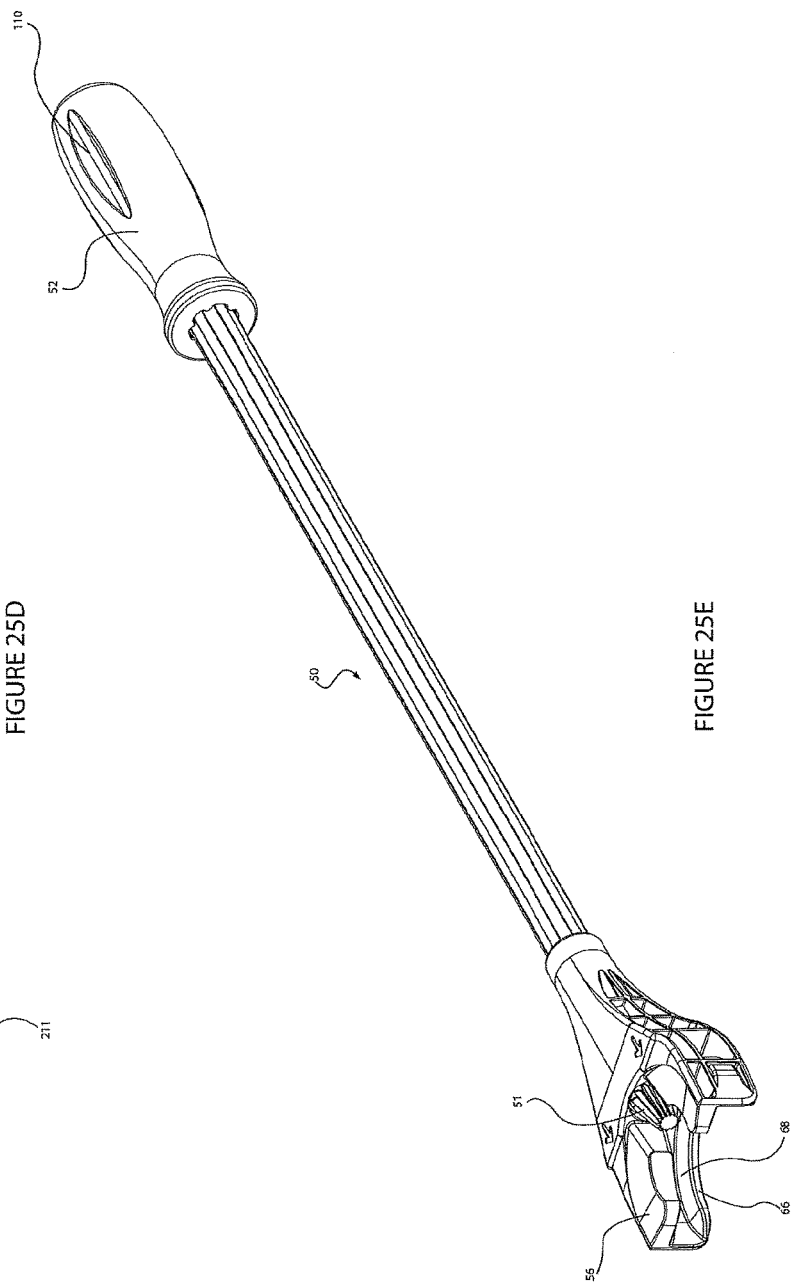
FIG. 25E is a perspective view of the tool from FIG. 25A.

The tool 50 of FIGS. 25A to 25C may be simpler than previously illustrated embodiments, for example embodiments of FIGS. 1A and 13A, for example because the tool of FIGS. 25A to 25C does not have articulation between the driving member and the handle. The only moving parts in the tool of FIGS. 25A to 25C are the driving member 51, the torque input, and the shaft connected directly between the handle and the driving member. The driving member 51, shaft 65 and handle 52 rotate relative to a head of the tool adapted to couple to the coupling 10. In some embodiments the shaft 65 may not be shrouded by an arm. The embodiment of FIGS. 25A to 25D may be a cheaper alternative to a more expensive embodiment. For example the tool of FIGS. 25A to 25C may be for home use (and may be used only once or a limited number of times), whereas a more expensive version of the tool may be for a professional installer (of for example cabinetry) where the tool is to be used many times over a long time period.

In some embodiments, as illustrated by the embodiment of FIGS. 25A to 25D, the handle 52 has engagement features on an outside surface. In the particular illustrated embodiment the engagement features are longitudinal slots 110. In the illustrated embodiment there are four slots 110 spaced apart around a circumference of the handle. There could be more than four slots, or less than four slots, for example two slots oppositely opposed on a circumference of the handle. In some embodiments the engagement features may be longitudinally extending ribs on an outer surface of the handle spaced apart around a circumference of the handle. In some embodiments there may be two or more ribs.

The engagement features on the outside of the handle are adapted to engage with an inner surface of a handle extension. For example a handle extension may be a length of pipe or an elongate member with a socket for receiving the handle. An example handle extension 200 is illustrated in FIG. 25D partly shown in cross section. Handle 52 of tool 50 is received in a socket 210 of handle extension 200. The socket has complementary engagement features for example ribs or slots for engaging the slots or ribs on the handle to rotationally lock the handle extension to the handle. The example of FIG. 25D has ribs 211 for engaging slots 110 (shown in hidden detail in FIG. 25D) of tool handle 52. The handle extension may provide a further handle 252 for turning the driving member 51 of tool 50 via the engagement with the handle 52 of the tool. The handle extension 200 may allow the tool to reach the legs at the rear of a particularly deep cabinet or other structure being supported by legs comprising a coupling or foot according to some embodiments of the present invention. Further, as the handle extension 200 is detachable from the handle 52, the tool 50 and handle extension may be of a length to allow both to fit within a typical size of tool box for convenient storage and transportation. In some embodiments the tool handle 52 may comprise an internal bore comprising engagement features for interfacing with corresponding engagement features on an outer surface of a handle extension.

The length of the engagement features of the handle 52 for interfacing with the handle extension 200 provides for an inflexible or rigid coupling between the handle and handle extension. By comparison, the torque input 61 for connecting for example a power tool provides for relatively short length of engagement such that the power tool engaging with the socket 61 can be moved (for example pivoted) relative to the tool 50. However, the engagement between the handle 52 and handle extension provides for no movement between the handle 52 and the handle extension 200. For example, the socket 211 may engage the handle 52 over a length of at least 50 mm, or 60 mm, or 70 mm or more.

In this specification and claims, the phrase "rotary rack" is used to describe a ring gear with axial facing gear teeth, for example a face gear, crown gear or bevel gear. Further, the rotary rack in the illustrated embodiments may be described as a straight bevel gear. A ring gear allows for the driving member or pinion to engage with the driven member from a lateral direction. In a preferred embodiment the driving member and driven member are bevel gears.

The gears releasably mesh together in a lateral direction when engaging the tool with the coupling. That is the gears laterally mesh together when engaging the tool with the coupling. The gears are releasably meshed together when the tool is engaged with the coupling. When the tool is disengaged from the coupling the gears are separated.

In this specification and claims, the term "gear" is intended to mean a rotary gear that is free to rotate continuously in at least one direction. Preferably the driving member is a gear that is free to rotate in both directions.

In some embodiments the rotary rack has an outer diameter in the range of about 30 mm to 100 mm, or about 40 mm to 90 mm, or about 50 mm to 80 mm. In some embodiments, the outer diameter of the rotary rack is about 60 mm, or 70 mm, or 80 mm.

In some embodiments the rotary rack has a width (distance between an outer radius and inner radius of the rack face) of about 5 to 20 mm, or about 8 to 15 mm, or about 10 to 12 mm. In some embodiments the rack width is about 10 mm. The pinion may have a length substantially similar to the width of the rotary rack.

In some embodiments the rotary rack may have about 40 to 200 teeth, or 50 to 100 teeth, or 60 to 80 teeth, or about 70 teeth.

In some embodiments the pinion is generally frustoconical, having a smaller diameter at a forward end (furthest from the handle end of the tool) and a larger diameter at a rearward end (nearest the handle end of the tool). In some embodiments the pinion may be generally cylindrical having straight sides. The pinion may have a diameter of about 5 to 20 mm, or about 7 to 18 mm. Where the pinion is generally frustoconical, in some embodiments the pinion has a diameter at a smaller end of about 5 to 15 mm and a diameter at a larger end of about 10 to 30 mm. In some embodiments, the small end and large end of the pinion have diameters of about 9 to 10 mm and 16 to 17 mm.

As described above, in some embodiments the pinion is fixed to the torque input without any articulation between the pinion and torque input. In such an embodiment, the pinion and rack are arranged so that the angle of the lateral axis on which the pinion rotates is at an angle such that the height of the handle or arm of the tool is less than the height of a typical toe-kick height of a cabinet when the tool is engaged to a foot at the rear of the cabinet and with the handle of the tool extending beyond the front of the cabinet. Preferably the pinion and rack are arranged so that the lateral axis of the pinion and torque input is less than about 12.5 degrees so that the handle or arm of the tool clears the bottom of the cabinet.

Where the pinion is frustoconical, the toothed surface of the rotary rack is inclined to mesh with the pinion. This arrangement allows for the thickness of the rotary rack at the perimeter of the rotary rack to be less than the thickness of the rotary rack at an inner diameter of the rotary rack (for example where the rack meets the diameter portion 14 of the coupling, or the threaded socket or shaft).

In some embodiments, as illustrated in FIG. 13B, the back side of the rotary rack is inclined, and the surface 68 of the tool that provides a back support for the rotary rack is inclined to match, to support the back of the rack as described above. Where the back side of the rotary rack is inclined, the thickness of the rotary rack at the perimeter of the rotary rack is less than the thickness of the rotary rack at an inner diameter of the rotary rack.

A reduced thickness at the outer perimeter of the rack compared to the thickness at the inner perimeter of the rack can assist in some embodiments with engagement of the rack to the pinion. Where the pinion is frustoconical and/or a surface of the back support flange 66 is inclined, the pinion and the back support flange 66 of the tool present an axial gap between the pinion and the flange 66 that converges from the forward end of the pinion towards the rearward end of the pinion. As the thickness of the rack at the perimeter of the rack is less than the axial gap between the pinion and the flange 66 at the forward end of the pinion the driven member of the foot is easily received between the pinion and the surface 68 of the back support flange 66. In some embodiments this arrangement assists with alignment of the rack to the pinion to ensure the pinion engages with the rack as the tool engages the foot from a lateral direction. For example, where the axial gap between axial surfaces 62 and 68 is greater than the thickness of the driven member 13, final axial alignment of the tool to the foot and engagement of the pinion to the rotary rack may be achieved by the first axial surface 68 and the pinion capturing the rotary rack between the pinion and surface 68. In some embodiments, the back support flange 66 may have a ramped surface 81 for receiving the rack between the pinion and the flange.

Preferably the back side 19 of the rack is at an angle of 0 to 12.5 degrees (where 0 degrees is perpendicular to the longitudinal axis of the foot). An acute angle or perpendicular is preferred so that the flange 66 exerts a predominantly upward component of force to counteract the pinion lifting off the rack or the rack deflecting from the pinion when the pinion drives the rack. For example, with reference to FIGS. 26A to 26D, in some embodiments the back side of the rack 13 comprises a portion 19 that is substantially perpendicular to the longitudinal axis of the foot. Preferably the perpendicular portion 19 is at a perimeter portion of the back side of the rack. As shown in FIG. 26B, the flange 66 of the tool has a corresponding axial facing bearing surface 68 that is also perpendicular to the longitudinal axis of the tool when the tool is engaged with the foot.

Other gear arrangements may be envisaged. For example, in some embodiments, the driving member and driven member may comprise spur gears, when meshed together the driven member and driving member having parallel rotational axis. The driving member may be a pinion and the driven member a gear, the pinion and gear having parallel rotational axes. In such an embodiment, a worm gear or bevel gear or universal joint or joints may couple the driving member to tool handle 52 or torque input.

In some embodiments the foot or coupling may be formed from a plastics material, for example moulded from Acetal or other suitable plastics material. The tool may also be generally formed from plastics materials, for example Acetal, polypropylene and/or ABS. The pinion of the tool may be formed from steel or a suitable plastics material, for example glass filled nylon. In the embodiments of FIGS. 10 and 19 the shaft 65 may be formed from steel, and in the embodiment of FIG. 65 the shaft may be formed from Aluminium, for example a hollow extrusion.

A foot or coupling and a tool according to the present invention are adapted so that the tool remains continuously engaged with the driven member or feature when driving the driven member or feature to rotate the coupling or foot. For example, the tool can rotate the coupling by a part revolution, a full revolution, or many revolutions and in both directions without being disengaged from the coupling. The tool does not need to be disengaged and reengaged from and to the coupling during complete adjustment of the leg height. The tool can adjust the length of the leg up and down without disengaging the tool from the coupling. The tool is adapted to be held stationary in a circumferential direction relative to the leg when the driving member drives the driven member or feature for adjusting the height of the object supported by the leg. Thus the tool is not limited to working in a particular arc length around the leg, but remains in a stationary angular position relative to the leg during height adjustment. With the driving member engaged to the driven member or feature, rotation of the tool handle or other torque input about an axis independent of the longitudinal axis of the leg (e.g. the shaft of the foot) drives the driven member or feature for height adjustment of the leg. The tool may be used to adjust the leg in both directions without removing the tool from the coupling. For example, the handle of the tool may be rotated in one direction (for example clockwise) to increase the height of the leg and then in the opposite direction (anti-clockwise) to reduce the height of the leg, while the tool remains continuously engaged to the leg. In other words, the tool is adapted so that the direction of height adjustment (up or down) can be reversed without removing the tool from the coupling. The driving member stays continuously engaged with the driven member to effect a change in height of the leg in at least one direction. For example, in some embodiments the tool can drive the coupling by more than 180 degrees, or 270 degrees, or at least one full revolution, or 2 revolutions, or 3 revolutions or more, in either or both directions without disengaging the driving member from the driven member. The handle of the tool remains stationary or does not rotate substantially around the leg, for example by less than one full revolution, or less than 270 degrees, or less than 180 degrees, or less than 90 degrees, or less than 45 degrees. The tool is adapted to adjust the height of the leg by many degrees of rotation of the coupling for minimal degrees of rotation of the tool about the about the longitudinal axis of the leg.

In some embodiments the driving member stays continuously engaged with the driven member to effect a change in height of the leg in both directions. This is particularly useful for fine tuning the height of a leg to achieve a level installation of a cabinet or other object. Where an adjustment in one direction overshoots a height level, adjustment in the opposite direction can be made immediately without removing the tool from the foot. This can be a significant advantage when adjusting the heights of many legs in a single installation, for example when installing kitchen cabinetry which often includes 30 or more legs. Typically some legs require adjustment upwards and others require adjustment downwards, requiring many changes in direction of adjustment. Likewise, there is no need to disengage a third party torque input such as a power drill, to change direction. When installing cabinetry having many legs for height adjustment, the speed and simplicity of adjustment provided by the tool and coupling of the present invention provides a substantial contribution to the art.

Figure 27B:
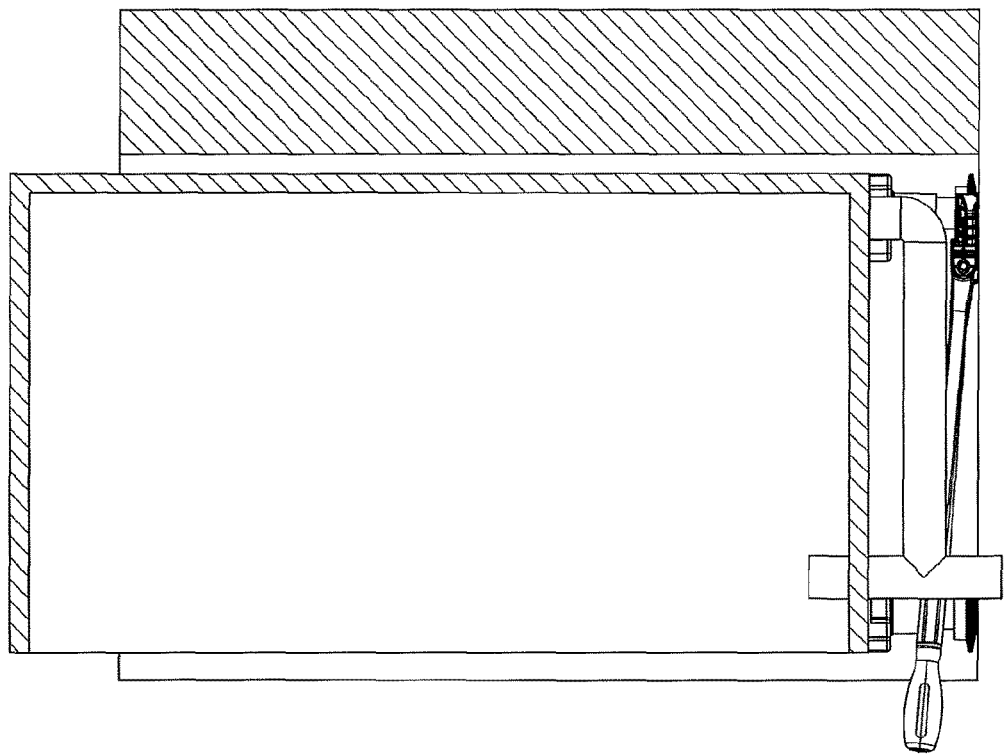
FIGS. 27A and 27B illustrate a plan and side view of a cabinet installation in which access to rear legs of the cabinet is limited by an obstruction beneath the cabinet.
Figure 27A:
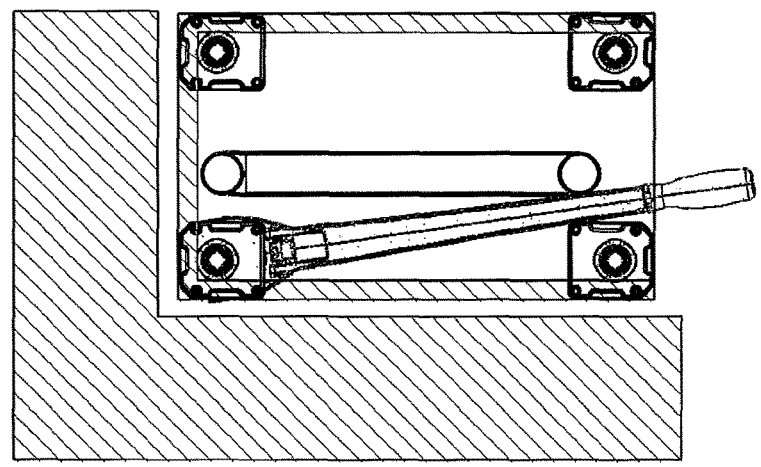

A user holds the tool stationary relative to the leg, for example by arm 53 of the tool with one hand, while turning the tool handle to adjust the leg height with the other hand, or simply by handle 52 or another tool coupled to tool 50 via socket 61. In use, as the driving member is used to drive the driven member, the arm of the tool does not rotate about the longitudinal axis of the leg but may remain stationary. Further, the tool can engage the foot or coupling laterally from essentially any angular direction relative to a longitudinal axis of the threaded shaft of the leg. These features of the tool and foot provide a significant advantage when installing and levelling cabinetry, especially in circumstances where access to one or more legs is limited. For example, with reference to FIGS. 27A and 27B which illustrate a plan and a side view of a narrow cabinet installed in the corner of a room. Access to the rear left foot is available at a narrow radial position, access being limited by an adjacent wall and also obstructions under the cabinet, which in the illustrated example is plumbing fittings or pipe work and a front leg. In such a limited space, adjustment by a prior art tool that scribes an arc about the foot is very difficult. For a tool as described, adjustment of the rear foot is accomplished with the arm of the tool remaining stationary in the limited angular position shown and with the tool continuously engaged with the foot.

In some embodiments the driven member or feature remains at a fixed height relative to a floor surface or other surface supporting the leg at least when driving the coupling to raise the object being supported. The tool axial position may therefore be referenced from the floor surface for engagement with the coupling, to assist with engagement between the tool and foot.

As described above the leg may be used for height adjustment. Where a leg is used for sideways support, the longitudinal axis of the threaded shaft would be oriented horizontally. For example the present invention may be applied to a leg supporting a side of a cabinet or appliance from an adjacent wall. In this specification and claims, the term "height" is not intended to be limited to use only in vertical orientation but any orientation. Thus the term "height" in this specification and claims should be read broadly to mean "length" or "distance".

The foregoing description of the invention includes preferred forms thereof. Modifications may be made thereto without departing from the scope of the invention.

The invention claimed is:

1. An apparatus for adjusting a height adjustable leg for vertically supporting a cabinet, appliance or structure comprising:
   a coupling for forming part of a height adjustable leg that has a longitudinal axis, the coupling comprising a driven member, and
   a tool comprising a jaw, a driving member to rotate relative to the jaw about a rotational axis and at least one torque input for applying torque to the driving member, the jaw configured and adapted for releasably capturing the coupling with the tool lateral to the longitudinal axis direction to hold the driving member in releasable engagement with the driven member to allow the driving member to drive the driven member to rotate the coupling about the longitudinal axis of the height adjustment of the leg, and
   wherein the driving member and the driven member are gears that can releasably mesh together from a plurality of radial directions relative to the longitudinal axis of the leg and wherein the tool is able to remain in a stationary radial position relative to the longitudinal axis of the leg yet allow the driving member to rotationally drive the driven member.

2. The apparatus as claimed in claim 1 wherein said at least one torque input and the driving member rotate about an axis that is lateral relative to a longitudinal axis of the leg when driving the driven member.

3. The apparatus as claimed in claim 1 wherein the tool and coupling are adapted to remain continuously engaged when the driving member drives the driven member to rotate the coupling about the longitudinal axis of the leg in both rotational directions so that the direction of height adjustment of the height adjustable leg in the longitudinal direction can be reversed without releasing the tool from the coupling.

4. The apparatus as claimed in claim 1 wherein with the tool engaged with the coupling the driving member and the driven member are adapted to remain engaged to allow for continuous adjustment of the height adjustable leg in at least one direction, or are adapted to remain continuously engaged for adjusting the height of the height adjustable leg in both directions.

5. An apparatus as claimed in claim 1 wherein the coupling is a foot comprising the driven member and a threaded shaft engaging a corresponding threaded socket of and to form the height adjustable leg.

6. The apparatus as claimed in claim 1 wherein the driven member remains at a fixed height relative to a floor surface or other surface on which the leg is to be positioned when vertically supporting the cabinet, appliance or structure.

7. The apparatus as claimed in claim 1 wherein the tool comprises a guide or positioning feature or features for setting the driving member at a height fixed relative to the driven member so that the driving member is positioned axially fixed relative to the coupling for engagement with the driven member.

8. The apparatus as claimed in claim 1 wherein the jaw extends around the coupling by more than 180 degrees.

9. The apparatus as claimed in claim 1 wherein one of:
(i) the tool comprises an axial direction facing bearing surface and the coupling comprises a corresponding axial direction facing bearing surface, and
(ii) the tool comprises a first axial direction facing bearing surface and a second opposite axial direction facing bearing surface and the coupling comprises two corresponding axial direction facing bearing surfaces,
contact between the tool and coupling axial direction facing bearing surfaces retaining the tool to the coupling in an axial direction to axially hold the gears in their meshed condition yet allow releasable engagement between the driving member and the driven member.

10. The apparatus as claimed in claim 9 wherein the tool comprises a ramp surface to bear against the axial direction facing surface of the coupling when aligning the tool to the coupling in use to position the tool to the coupling axially.

11. The apparatus as claimed in claim 9 wherein the tool comprises a flange for bearing against a backside of the driven member, the flange providing the axial direction facing bearing surface of the tool and the backside of the driven member being the axial direction facing bearing surface of the coupling.

12. The apparatus as claimed in claim 11 wherein with the tool engaged with the coupling the driven member is captured between the driving member and the axial direction facing bearing surface of the tool.

13. The apparatus as claimed in claim 9 wherein the first and second axial direction facing bearing surfaces of the tool form sides of a slot or channel for receiving the driven member, axial direction facing sides of the driven member providing the axial direction facing bearing surfaces of the coupling to axially align the tool to the coupling.

14. A coupling for forming part of an elongate height adjustable leg for vertically supporting a cabinet, appliance or structure, the coupling comprising:
a driven member and an elongate direction facing bearing surface,
the coupling adapted to releasably maintain engagement with a tool comprising a driving member to allow the driving member to drive the driven member to rotate the coupling about a rotational axis coaxial an elongate direction axis of the leg for height adjustment of the leg, the elongate direction facing bearing surface adapted to directly or indirectly interface with a corresponding elongate direction facing bearing surface of the tool to releasably retain the tool to the coupling in the elongate direction to releasably maintain engagement between the driving member and the driven member, and
wherein the driven member is a gear adapted to releasably mesh with the driving member of the tool.

15. The coupling as claimed in claim 14 wherein the elongate direction facing bearing surface is at an angle of 0 to 12.5 degrees, where 0 degrees is perpendicular to the longitudinal axis of the coupling, or wherein the elongate direction facing bearing surface is substantially perpendicular to the rotational axis of the coupling.

16. The coupling as claimed in claim 14 wherein the elongate direction facing bearing surface is at a perimeter portion of the back side of the gear.

17. The coupling as claimed in claim 14 wherein a back side of the gear comprises an inclined surface so that the thickness of the gear at the perimeter of the rotary rack is less than the thickness of the gear at an inner diameter of the gear.

18. The coupling as claimed in claim 14 wherein the coupling comprises a first elongate direction facing bearing surface and a second opposite elongate direction facing bearing surface to interface with two corresponding elongate direction facing bearing surfaces of the tool so that contact between the tool and coupling elongate direction facing bearing surfaces releasably retains the tool to the coupling axially to axially hold the driving member yet releasably maintain engagement between the driving member and the driven member.

19. The coupling as claimed in claim 18 wherein the gear is adapted to engage a slot or channel in the tool, teeth of the gear providing said elongate direction facing bearing surface and the back side of the driven member providing the other said second elongate direction facing bearing surface.

20. The coupling as claimed in claim 14 wherein the gear comprises 40 to 200 teeth.

21. A tool for rotationally driving a driven member of a coupling of a height adjustable leg having an elongate axis and for supporting a cabinet, appliance or structure, the tool comprising:
a driving member,
a torque input for applying torque to the driving member,
a jaw, relative to which the driving member can rotation, to releasably engage the height adjustable leg in a manner to capture the coupling in a direction lateral to the elongate axis to releasably maintain engagement between the driving member and the driven member to allow the driving member to rotationally drive the driven member upon rotation of the driving member to adjust the height of the cabinet, appliance or structure, and wherein the driving member is a gear adapted to releasably mesh with the driven member.

22. An apparatus for adjusting a height adjustable leg for vertically supporting a cabinet, appliance or structure comprising:
a coupling for forming part of a height adjustable leg that has a longitudinal axis, the coupling comprising a driven member, and
a tool comprising a handle and an extension dependent from the handle, a driving member to rotate relative the extension about a rotational axis of the driving member that extends in use radial to the longitudinal axis and a torque input for applying torque to the driving member, wherein one of the extension and the driving member can releasably register the tool in the longitudinal axis direction relative to the coupling to releasably hold the driving member in engagement with the driven member to allow the driving member to drive the driven member to rotate the coupling about the longitudinal axis of the leg for height adjustment of the leg without needing to rotate the handle about the longitudinal axis, and
wherein the driving member and the driven member are gears that can releasably mesh together at a plurality of radial directions relative to the longitudinal axis of the leg.

23. An adjustable prop for supporting and vertically adjusting relative to a support surface, the height of a cabinet, appliance or structure carrying a threaded component, and a tool for adjusting the prop relative to the cabinet, appliance or structure, the prop comprising:
- a threaded member to threadably engage to the threaded component, relative rotation between the threaded member and the threaded component moving the threaded member axially relative to the threaded component and thereby adjusting the height of the cabinet, appliance or structure, and
- a driven member to rotate with the threaded member relative to the threaded component, the tool comprising;
- a handle and an extension dependent from the handle, a driving member to rotate relative the extension about a rotational axis of the driving member that extends in use radial to the axis of the threaded member and a torque input for applying torque to the driving member, the extension to releasably hold the tool relative the prop in at least one of a direction parallel the axis of the threaded member and lateral to the axis of the threaded member to hold the driving member and the driven member in releasable engagement and allow the driving member to drive the driven member to rotate the threaded member to move the threaded member axially relative to the threaded component without needing to rotate the handle about the axis, and
- wherein the driving member and the driven member are gears that releasably mesh together when the tool is engaged with the prop.

24. An apparatus for adjusting a height adjustable leg having an elongate axis, for supporting and adjusting the height of a cabinet, appliance or structure above a supporting surface, comprising:
- a coupling for forming part of the height adjustable leg, the coupling comprising a first bevel gear to rotate about the elongate axis and a threaded socket or a threaded shaft to be rotated about the elongate axis by the first bevel gear relative to a corresponding threaded shaft or socket of the height adjustable leg with which the first mentioned threaded socket or threaded shaft are threadingly engaged, and
- a tool comprising a second bevel gear to releasably mesh with the first bevel gear and a torque input for applying torque to the second bevel gear and a jaw able to releasable engage said height adjustable leg from a plurality of directions radial to the axis and releasably hold the tool laterally relative to the height adjustable leg to releasably maintain engagement between the first and second bevel gears to allow the second bevel gear to drive the first bevel gear to rotate the coupling about a longitudinal axis of the leg for height adjustment of the leg.

25. A tool for rotationally driving a driven member of a coupling of a height adjustable leg having an elongate axis and supporting a cabinet, appliance or structure the tool comprising:
- a handle presenting a driving member, a torque input for applying torque to the driving member, an extension relative to which the driving member can rotate and to releasably engage the height adjustable leg in a manner to releasably capture the tool to the coupling in a direction parallel the elongate axis to thereby releasably maintain engagement between the driving member and the driven member and allow the driving member to rotationally drive the driven member upon rotation of the driving member to adjust the height of the cabinet, appliance or structure, without needing to rotate the handle about the elongate axis, and
- wherein the driving member is a gear adapted to releasably mesh with the driven member.

26. An apparatus for adjusting a height adjustable leg for vertically supporting a cabinet, appliance or structure comprising:
- a coupling for forming part of a height adjustable leg comprising a driven member configured to rotate about the longitudinal axis of said height adjustable leg; and
- a tool comprising
  - a jaw,
  - a driving member rotatable about a rotational axis relative to said jaw,
  - said jaw configured and adapted for releasably capturing a diameter of said driven member lateral to said longitudinal axis; and
  - For holding said driving member in releasable engagement with said driving member; and
- at least one torque input for applying torque to said coupling and rotating said driving member about said longitudinal axis for leg height adjustment when said coupling is captured by said jaw,
- wherein said driving member and the driven member are gears that releasably mesh together when the tool is engaged with the coupling from a plurality of radial directions relative to the longitudinal axis of the leg and
- wherein the tool is able to remain in a stationary radial position relative to the longitudinal leg yet allow the driving member to rotationally drive the driven member.

* * * * *

UNITED STATES PATENT AND TRADEMARK OFFICE
CERTIFICATE OF CORRECTION

PATENT NO. : 10,278,500 B2
APPLICATION NO. : 15/028295
DATED : May 7, 2019
INVENTOR(S) : Wim Jan De Bruin It is certified that error appears in the above-identified patent and that said Letters Patent is hereby corrected as shown below:

In the Claims

Column 32, Lines 21-32, change "rotation" to --rotate--.

Column 34, Line 35, change "For" to --for--.

Signed and Sealed this
Twenty-third Day of July, 2019

Andrei Iancu
*Director of the United States Patent and Trademark Office*